United States Patent
Ueno et al.

(10) Patent No.: US 10,082,909 B2
(45) Date of Patent: Sep. 25, 2018

(54) HOLDING MANNER DETERMINATION DEVICE AND RECORDING MEDIUM

(71) Applicant: Sharp Kabushiki Kaisha, Sakai, Osaka (JP)

(72) Inventors: Masafumi Ueno, Sakai (JP); Kazuyoshi Yoshiyama, Sakai (JP); Takeshi Masuda, Sakai (JP); Hiroyuki Furukawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/503,749

(22) PCT Filed: Jun. 17, 2015

(86) PCT No.: PCT/JP2015/067493
§ 371 (c)(1),
(2) Date: Feb. 14, 2017

(87) PCT Pub. No.: WO2016/047223
PCT Pub. Date: Mar. 31, 2016

(65) Prior Publication Data
US 2017/0255332 A1    Sep. 7, 2017

(30) Foreign Application Priority Data
Sep. 26, 2014  (JP) ................................. 2014-197533

(51) Int. Cl.
*G06F 3/0488*    (2013.01)
*G06F 3/041*    (2006.01)
(Continued)

(52) U.S. Cl.
CPC .......... *G06F 3/0418* (2013.01); *G06F 1/1626* (2013.01); *G06F 1/1643* (2013.01); *G06F 3/044* (2013.01); *G06F 3/0488* (2013.01)

(58) Field of Classification Search
CPC combination set(s) only.
See application file for complete search history.

(56) References Cited

U.S. PATENT DOCUMENTS 9,836,145 B2 * 12/2017 Sakurazawa ............ G06F 3/041
2013/0106776 A1    5/2013 Park et al.
(Continued)

FOREIGN PATENT DOCUMENTS

JP    2013-097798 A    5/2013
JP    2013-235468 A    11/2013
(Continued)

OTHER PUBLICATIONS

Official Communication issued in International Patent Application No. PCT/JP2015/067493, dated Aug. 11, 2015.

*Primary Examiner* — Van N Chow
(74) *Attorney, Agent, or Firm* — Keating & Bennett, LLP

(57) ABSTRACT

Provided is a holding manner determination device that accurately determines a manner of holding an information terminal. A matching processing unit (312) calculates a coincidence between distribution data of sensor values detected by a touch panel (10) and holding hand reference data (Ref1), and a holding hand determination unit (314) determines a holding hand on the basis of holding hand information of the holding hand reference data (Ref1) whose coincidence with detection data is equal to or greater than a threshold.

9 Claims, 20 Drawing Sheets

(51) Int. Cl.
*G06F 3/044* (2006.01)
*G06F 1/16* (2006.01)

(56) References Cited

U.S. PATENT DOCUMENTS

2013/0215060 A1  8/2013  Nakamura
2015/0135145 A1  5/2015  Kamide et al.

FOREIGN PATENT DOCUMENTS

JP    2014-26323 A    2/2014
WO    2012/049942 A1    4/2012
WO    2013/187137 A1    12/2013

* cited by examiner

FIG. 5

Ref1

| DATA No. | HOLDING HAND INFORMATION (ROOT OF THUMB (RIGHT HAND):1, OTHERS (LEFT HAND):0) | REFERENCE REGION INFORMATION (COORDINATE OF POSITION WHERE SEGMENTATION OF DATA IS STARTED:x) | REFERENCE WAVEFORM DATA (10 SENSOR VALUES:z) |
|---|---|---|---|
| 1 | 0 | 2 | 43, 128, ... |
| 2 | 1 | 4 | 24, 194, ... |
| : | : | : | : |

FIG. 6
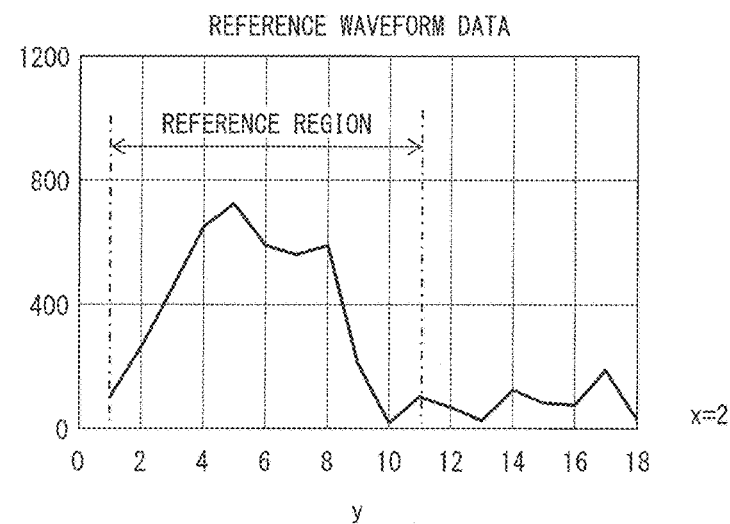
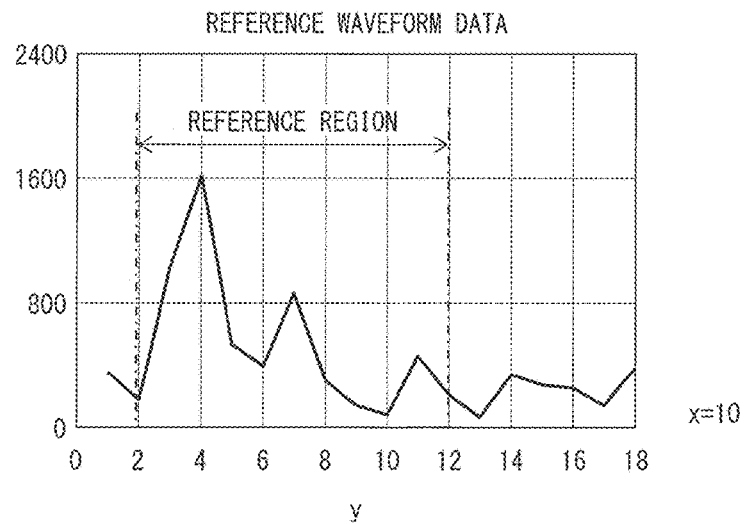

FIG. 13

| DATA No. | HOLDING HAND INFORMATION (RIGHT HAND:1, LEFT HAND:0) | REFERENCE REGION INFORMATION (CENTER COORDINATES: (x, y)) | OPERATION FINGER ROOT POSITION INFORMATION (COORDINATE:y) | REFERENCE WAVEFORM DATA (SENSOR VALUES OF (5X5) TOUCH SENSORS IN REFERENCE REGION:z) |
|---|---|---|---|---|
| 1 | 0 | 5, 11 | 2 | 43, 128, · · · 56, · · · : |
| 2 | 1 | 7, 16 | 4 | 24, 194, · · · 48, · · · : |
| : | : | : | : | : |

Ref2

FIG. 16

| SETTING ITEM (USER INFORMATION) | PURPOSE OF SETTING | WHAT KIND OF REFERENCE DATA IS TO BE STORED |
|---|---|---|
| AGE | • ESTIMATE HAND SIZE<br>• ESTIMATE OPERATION METHOD (ONE HAND/BOTH HANDS) AND HOLDING MANNER ON THE BASIS OF STATISTICAL DATA | • DATA MATCHING HAND SIZE<br>• DATA MATCHING FREQUENCY OF OPERATION BY ONE HAND/BOTH HANDS AND HOLDING MANNER |
| SEX | | |
| DOMINANT HAND | • RECOGNIZE WHICH OF RIGHT HAND AND LEFT HAND IS FREQUENTLY USED TO HOLD/OPERATE TERMINAL | • DATA MATCHING USAGE FREQUENCY OF RIGHT OR LEFT HAND |
| HAND SIZE (S, M, L, O, ETC.) | • RECOGNIZE HAND SIZE | • DATA MATCHING HAND SIZE |
| MANNER OF HOLDING TERMINAL (INITIAL REGISTRATION) | • ACQUIRE DATA DETECTED WHEN TERMINAL IS HELD | • DATA DETECTED WHEN TERMINAL IS HELD AND DATA SIMILAR THERETO |
| SHAPE AND SIZE OF TOUCH BY EACH FINGER (INITIAL REGISTRATION) | • RECOGNIZE SHAPE AND SIZE OF TOUCH BY EACH FINGER | • DATA DETECTED WHEN TERMINAL IS TOUCHED BY EACH FINGER AND DATA SIMILAR THERETO |

HOLDING MANNER DETERMINATION DEVICE AND RECORDING MEDIUM

TECHNICAL FIELD

The present invention relates to a holding manner determination device that determines a hand with which a mobile information terminal is held, a control program, and a recording medium.

BACKGROUND ART

In recent years, there have been mobile information terminals (hereinafter, abbreviated as terminals), such as smartphones and tablets, in which a display unit has a narrow frame or does not have a frame. There also have been terminals in which a housing has a frame with a narrow width.

Each of the terminals as described above has an advantage that a region of a display unit as an interface is wide. As another advantage, it is possible to detect a touch on an end portion (edge) of the terminal and provide an operation according to the touch.

For example, PTL 1 describes a mobile terminal apparatus that determines a manner of holding the mobile terminal apparatus on the basis of the number of touch regions which are regions where touches are detected by touch sensors and areas of the touch regions, and generates a display picture suitable for the holding manner.

However, when a user holds the terminal so as to grip it with his/her hand, the hand holding the terminal is in contact with an end portion of the terminal. The terminal may recognize such contact with the end portion of the terminal by the holding hand as a touch operation and execute an operation that is not intended by the user. Thus, a terminal that invalidates (that is, does not receive as a touch operation) contact with the end portion by the hand holding the terminal has been developed.

For example, a terminal apparatus described in PTL 2 acquires touch information, which is information about positions of touches and the number of touches, from touch sensors arranged on sides of a housing, and determines a holding hand on the basis of the acquired touch information. Then, on the basis of a result of the determination for the holding hand, the terminal apparatus determines a touch detected at either right or left (or upper or lower) end portion as contact by the holding hand, and invalidates the touch.

CITATION LIST

Patent Literature

PTL 1: WO2012/049942 (published on Apr. 19, 2012)
PTL 2: Japanese Unexamined Patent Application Publication No. 2014-26323 (published on Feb. 6, 2014)

SUMMARY OF INVENTION

Technical Problem

The mobile terminal apparatus and the terminal apparatus respectively described in PTL 1 and PTL 2 determine a holding hand on the basis of simple touch information processed from sensor signals detected by touch sensors, so that there is a problem that accuracy of the determination is insufficient. There is also a problem that when intensity of the sensor signals is minute, it may be difficult to generate the touch information from the sensor signals.

The invention has been made in view of the above and an object thereof is to provide a holding manner determination device capable of accurately determining a hand with which an information terminal is held.

Solution to Problem

In order to solve the aforementioned problems, a holding manner determination device according to one aspect of the invention includes a detection data acquisition unit that acquires detection data which is distribution data of sensor values detected by a plurality of touch sensors of an information terminal; a coincidence calculation unit that calculates a coincidence between reference data, which is the distribution data associated with a pre-assumed manner of holding the information terminal, and the detection data; and a holding manner determination unit that determines a manner of holding the information terminal on the basis of the coincidence calculated by the coincidence calculation unit.

Advantageous Effects of Invention

According to one aspect of the invention, an effect of allowing accurate determination of a hand with which an information terminal is held is exerted.

BRIEF DESCRIPTION OF DRAWINGS

FIG. 5 is a table illustrating an example of holding hand reference data stored in a storage unit of the mobile information terminal according to Embodiment 1.

FIGS. 6(*a*) and (*b*) illustrate an example of reference waveform data of holding hand reference data, and are graphs indicating sensor values detected in mutually different reference regions.

FIG. 13 is a table illustrating an example of operation finger reference data stored in a storage unit of the mobile information terminal according to Embodiment 2.

FIG. 16 is a table illustrating a relation between user information and holding hand reference data stored in a storage unit of the mobile information terminal according to Embodiment 3.

DESCRIPTION OF EMBODIMENTS

Embodiment 1

An embodiment of the invention will be specifically described below with reference to FIGS. 1 to 9.
(Configuration of Mobile Information Terminal 1)

Figure 1:
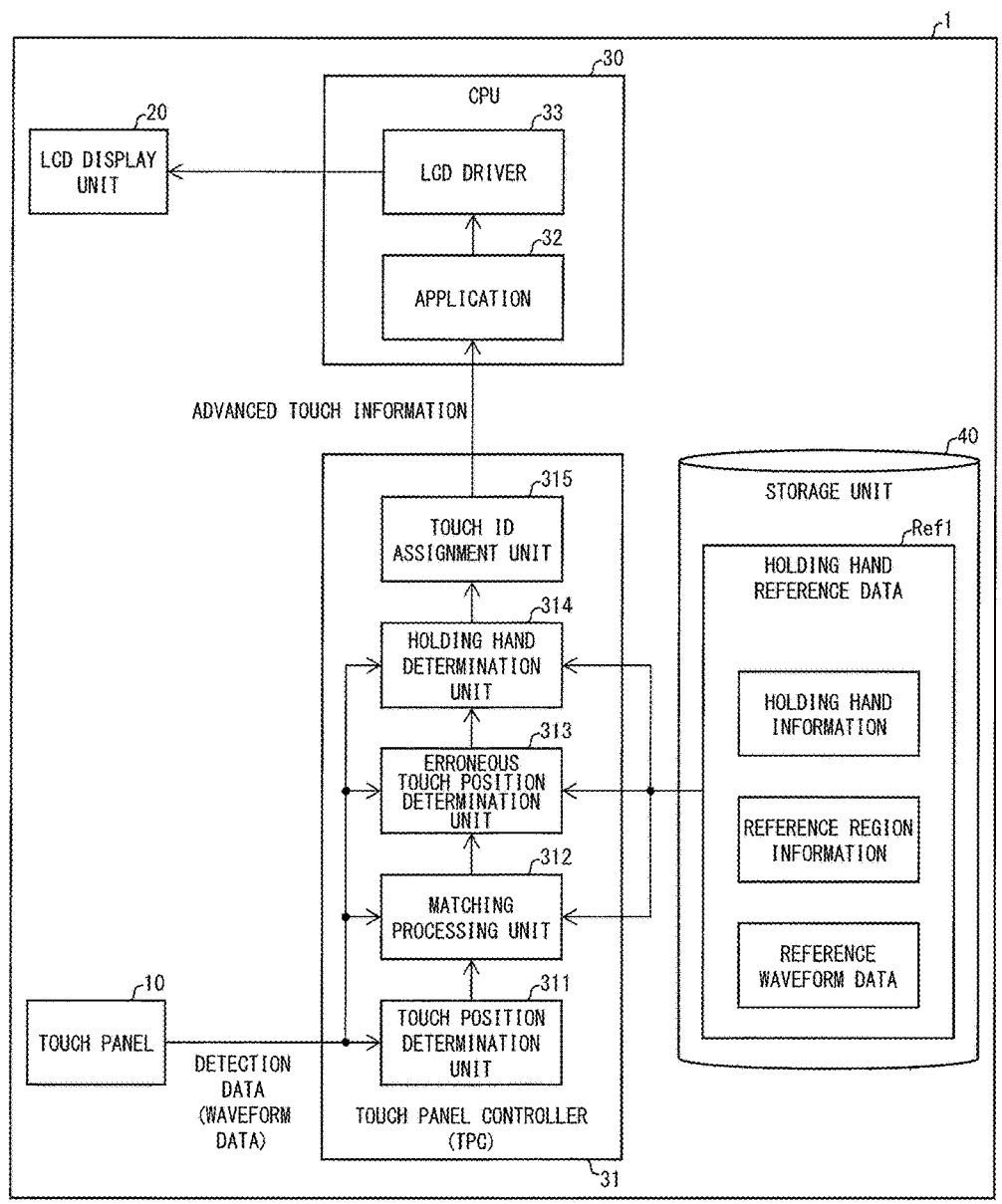
FIG. 1 is a block diagram illustrating a configuration of a mobile information terminal according to Embodiment 1.
Figure 2:
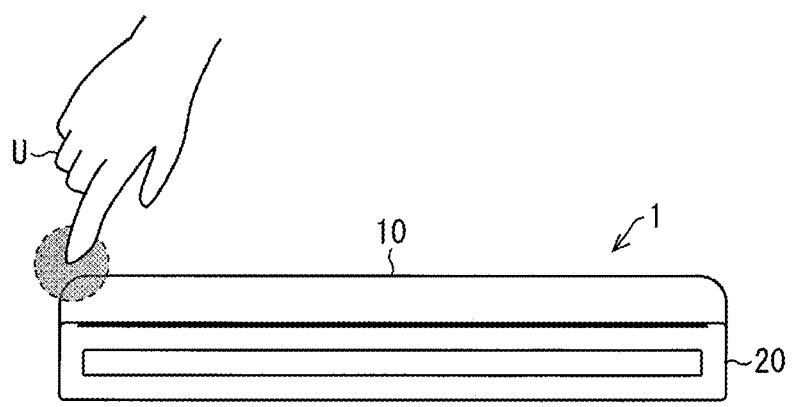
FIG. 2 is a side view illustrating an appearance of the mobile information terminal according to Embodiment 1.
Figure 3:
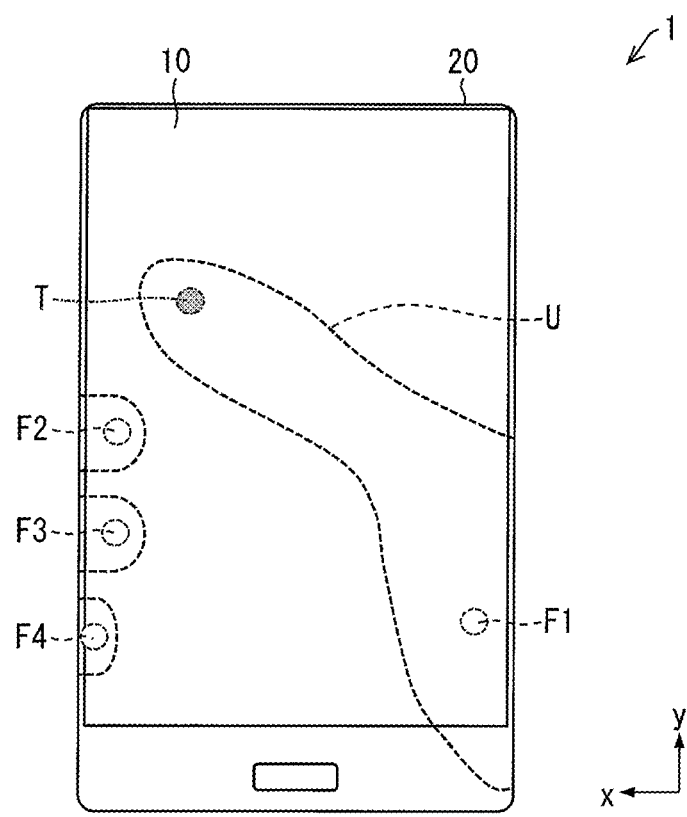
FIG. 3 is a top view illustrating an appearance of the mobile information terminal according to Embodiment 1.

A configuration of a mobile information terminal 1 (information terminal) (hereinafter, abbreviated as a terminal 1) according to the present embodiment will be described with reference to FIGS. 1 to 3. FIG. 1 is a block diagram illustrating a configuration of the terminal 1. FIG. 2 is a side view illustrating an appearance of the terminal 1. FIG. 3 is a top view illustrating an appearance of the terminal 1.

As illustrated in FIG. 1, the terminal 1 includes a touch panel 10, an LCD display unit 20, a CPU 30 (control device), a touch panel controller 31 (holding manner determination device), and a storage unit 40. The touch panel 10 is a capacitive touch panel. Note that, the touch panel 10 may be a pressure sensitive (resistive film) or optical detection touch panel, an infrared or ultrasonic touch panel (in which a touch is detected on the basis of reflected wave of infrared ray or ultrasonic wave), or a temperature detection touch panel (in which a touch is detected on the basis of a temperature of a holding hand or a resistance value which varies in accordance with the temperature).

The CPU 30 includes an application 32 (a reference data selection unit, a reference data acquisition unit) and an LCD driver 33. In other words, the CPU 30 executes the application 32 and controls the LCD driver 33. The application 32 controls the LCD driver 33 to thereby display an image or the like on the LCD display unit 20. The touch panel 10 is arranged on the LCD display unit 20.

The touch panel controller 31 controls the touch panel 10. As described later, the touch panel controller 31 analyzes detection data (touch sensor signal waveform data) acquired from the touch panel 10 to thereby generate advanced touch information.

Holding hand reference data Ref1 that is touch sensor signal waveform data acquired in advance is stored in the storage unit 40. The holding hand reference data Ref1 is distribution data associated with a pre-assumed manner of holding the terminal 1. Note that, a specific example of the holding hand reference data Ref1 will be described later.

As illustrated in FIG. 2, the terminal 1 receives a touch operation performed by a user touching the touch panel 10 with his/her finger U such as his/her thumb or forefinger. Since a frame (a region around the touch panel 10 on an upper surface of the LCD display unit 20) of the terminal 1 is very narrow (refer to FIG. 3), the terminal 1 is able to receive not only a touch operation for a center part of the terminal 1 but also a touch operation for an end portion of the terminal 1. Note that, the upper surface (display surface) of the terminal 1 may not be a plane and may be a curved surface such as in a cylindrical shape.

As illustrated in FIG. 3, the user normally performs the touch operation with his/her finger U (here, thumb U) while holding the terminal 1 so as to grip it. At this time, fingers (fingers that are not used for the touch operation) other than the thumb U erroneously contact (erroneously touch) a vicinity of the frame of the terminal 1, that is, an end portion of the touch panel 10 in some cases. There is also a case where the root of the thumb U erroneously touches the end portion of the touch panel 10. Note that, the frame of the terminal 1 may not be linear and may be curved such as in a circular shape. In FIG. 3, a point T represents a position at which the tip of the thumb U contacts the touch panel 10. A point F1 represents a position at which the root of the thumb U is in contact and each of a point F2 to a point F4 represents a position at which the finger that is not used for the touch operation is in contact. The thumb used for the touch operation is referred to as an operation finger U below. A finger that is not used for the touch operation is referred to as a non-operation finger.

As described above, the terminal 1 receives the touch operation for the end portion and hence may recognize an erroneous touch at each of the points F1 to F4 as the touch operation. When recognizing such an erroneous touch as the touch operation, the terminal 1 may execute an operation that is not intended by the user. For example, in a case where the contact with each of the points F1 to F4 is recognized as the touch operation by the terminal 1, the terminal 1 may be brought into a state of not receiving the touch operation by the tip of the operation finger U.
(Configuration of Touch Panel Controller 31)

As illustrated in FIG. 1, the touch panel controller 31 includes a touch position determination unit 311 (detection data acquisition unit), a matching processing unit 312 (coincidence calculation unit), an erroneous touch position determination unit 313 (erroneous touch determination unit), a holding hand determination unit 314 (holding manner determination unit), and a touch ID assignment unit 315 (a holding manner information output unit, an erroneous touch information output unit).

The touch position determination unit 311 determines positions and sizes (regions) of touches by using detection data acquired from the touch panel 10. The touch position determination unit 311 then outputs a determination result of the positions and sizes of the touches to the touch ID assignment unit 315.

In this case, the touch position determination unit 311 generates, from the detection data, touch sensor signal waveform data that is distribution data of sensor values obtained from a plurality of touch sensors of the touch panel 10. The touch sensor signal waveform data includes not only information of the positions and number of the touches but also information about detailed distribution (sizes of amplitude and features of a waveform) of the detected sensor values. Note that, the detection data may include only a sensor value obtained from a touch sensor at the end portion of the terminal 1 or include sensor values obtained from all the touch sensors of the touch panel 10.

Figure 4:
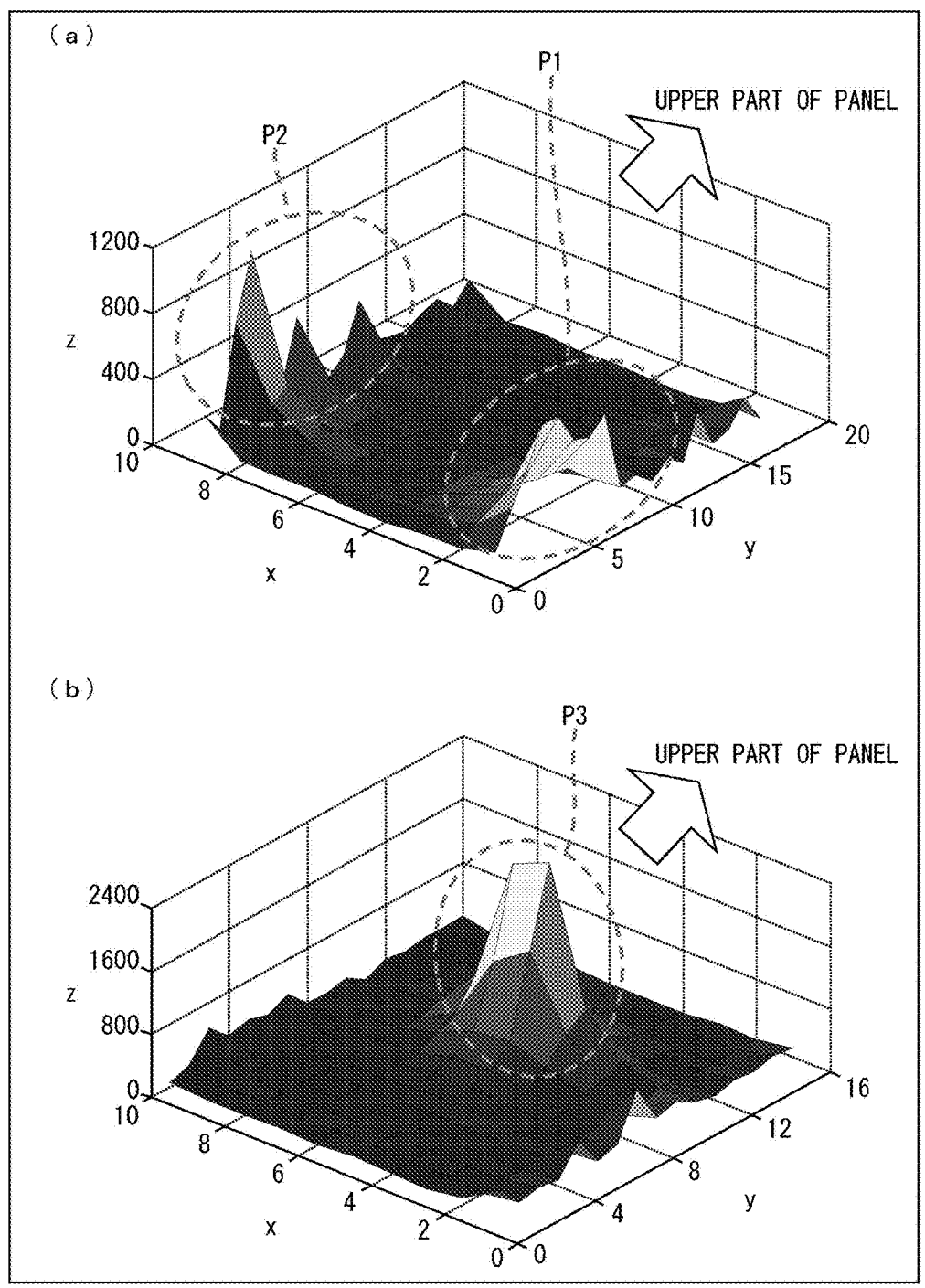
FIGS. 4(*a*) and (*b*) illustrate an example of touch sensor signal waveform data detected by a touch panel controller of the mobile information terminal according to Embodiment 1.

FIGS. 4(*a*) and (*b*) illustrate an example of the detection data (touch sensor signal waveform data). In FIGS. 4(*a*) and (*b*), values in x-axis and y-axis directions indicate positions (coordinates) in a surface of the touch panel 10. A value in a z-axis direction indicates a detected sensor value (capacitive value). Peaks indicated with surrounding broken lines P1 and P2 in FIG. 4(*a*) indicate sensor values detected near the point F1 (the position at which the root of the operation finger U is in contact) and the point F2 to the point F4 (the positions at which the non-operating fingers are in contact) in FIG. 3. A peak indicated with a surrounding broken line P3 in FIG. 4(*b*) indicates a sensor value detected near the point T (the position at which the tip of the operation finger U is in contact) in FIG. 3.

The matching processing unit 312 calculates a coincidence between the detection data acquired from the touch panel 10 and the holding hand reference data Ref1 stored in the storage unit 40. For example, the matching processing unit 312 calculates the coincidence between the detection data and the holding hand reference data Ref1 in accordance with a following calculation formula (normalized crosscorrelation) by using a general pattern matching method.

$$R_{NCC} = \frac{\sum_{j=0}^{N-1}\sum_{i=0}^{M-1} I(i,j)T(i,j)}{\sqrt{\sum_{j=0}^{N-1}\sum_{i=0}^{M-1} I(i,j)^2 \times \sum_{j=0}^{N-1}\sum_{i=0}^{M-1} T(i,j)^2}}$$ [Formula 1]

The calculation formula is a calculation formula for calculating a coincidence of two-dimensional (i,j) data, but may be used as a calculation formula for calculating a coincidence of one-dimensional data. Note that, the method of calculating the coincidence by the matching processing unit 312 is not limited to the method based on the calculation formula described above. For example, the matching processing unit 312 is also able to calculate the coincidence in accordance with a sum of difference absolute values or a sum of difference squares in order to reduce a calculation amount. The aforementioned configuration makes it possible to reduce the calculation amount of the matching processing.

Note that, in a case where there is holding hand reference data Ref1 whose value (specifically, a calculated value by the calculation formula) indicating the coincidence with the detection data is equal to or greater than a threshold in the storage unit 40, the matching processing unit 312 outputs the holding hand reference data Ref1 to the erroneous touch position determination unit 313 and the holding hand determination unit 314. Note that, in a case where there are plural pieces of holding hand reference data Ref1 whose coincidence with the detection data is equal to or greater than the threshold, the matching processing unit 312 outputs, to the erroneous touch position determination unit 313 and the holding hand determination unit 314, the holding hand reference data Ref1 (hereinafter, referred to as similar data Ref1) whose coincidence with the detection data is the highest among the plural pieces of holding hand reference data Ref1.

The erroneous touch position determination unit 313 determines a position of an erroneous touch on the basis of the detection data and the similar data Ref1. More specifically, the erroneous touch position determination unit 313 compares sensor values at the same position between the detection data and the similar data Ref1. Then, the erroneous touch position determination unit 313 determines that the position at which the sensor values are most coincident with each other is the position of the erroneous touch. The erroneous touch position determination unit 313 outputs a determination result of the position of the erroneous touch to the touch ID assignment unit 315. Note that, the erroneous touch position determination unit 313 may also output, to the touch ID assignment unit 315, information indicating a region (or a width) in which a coincidence between the sensor values is equal to or greater than a threshold in addition to the determination result of the position of the erroneous touch.

The holding hand determination unit 314 determines whether the hand with which the terminal 1 is held is a right hand or left hand on the basis of the similar data Ref1. More specifically, when holding hand information included in the similar data Ref1 indicates left (right), the holding hand determination unit 314 determines that the hand with which the terminal 1 is held is the left hand (right hand). The holding hand determination unit 314 outputs a determination result of the holding hand to the touch ID assignment unit 315. Note that, the holding hand determination unit 314 may also output, to the touch ID assignment unit 315, information indicating reliability of the determination result of the holding hand in addition to the determination result of the holding hand. For example, the holding hand determination unit 314 acquires the coincidence of the sensor values at the position of the erroneous touch from the erroneous touch position determination unit 313 and calculates the reliability in accordance with degree of the acquired coincidence.

Note that, the holding hand determination unit 314 is not limited to have a configuration of determining the hand with which the terminal 1 is held and may have a configuration of determining a manner of holding the terminal 1 (for example, a position or pattern at or in which the hand contacts the terminal 1).

The touch ID assignment unit 315 acquires (i) the determination result of the positions and sizes of the touches from the touch position determination unit 311, (ii) the determination result of the position of the erroneous touch from the erroneous touch position determination unit 313, and (iii) the determination result of the hand with which the terminal 1 is held from the holding hand determination unit 314.

The touch ID assignment unit 315 assigns a touch ID to each of the touches whose positions and sizes are determined by the touch position determination unit 311. The touch ID assignment unit 315 outputs, to the application 32, (i) basic touch information indicating the positions, sizes, and touch IDs of the touches, (ii) holding hand information indicating whether the hand with which the terminal 1 is held is the right hand or left hand, and (iii) erroneous touch information indicating the position of the erroneous touch. Information output by the touch ID assignment unit 315, that is, the basic touch information, the holding hand information, and the erroneous touch information is collectively referred to as advanced touch information below. Note that, the holding hand information may not be included in the advanced touch information and may be output to the application 32 separately from the advanced touch information.

Note that, when the information indicating the position of the erroneous touch is input from the erroneous touch position determination unit 313, the touch ID assignment unit 315 may remove the erroneous touch from the touches determined by the touch position determination unit 311. When the touch ID assignment unit 315 does not remove the erroneous touch, the CPU 30 (application 32) decides whether or not to remove the erroneous touch.

The touch ID assignment unit 315 may correct the positions and sizes of the touches determined by the touch position determination unit 311 on the basis of the erroneous touch information and the holding hand information. For example, the touch ID assignment unit 315 may combine (or link) a plurality of touches in proximate to each other to one touch and assign one touch ID to the touch, or may combine or separate the plurality of touches so as not to include the erroneous touch. In the latter configuration, a plurality of touches positioned near the erroneous touch are separated from each other.

Further, the touch ID assignment unit 315 may assign the same touch ID to a series of touches (from touch-in, move, to touch-out) continuing from a past frame to a current frame. By predicting a moving way of a touch on the basis of a position of the touch in the past frame or a change thereof, the position of the touch in the current frame may be corrected so that a track of the touch is smooth. Alternatively, in the case of a still touch, a position of the touch in the current frame may be corrected so as to be at the same position as that of the past touch. When a size of a touch is large (for example, a touch by a root of a thumb), a plurality of touches positioned near the touch may be combined to be corrected to one touch.

The application 32 that has acquired the advanced touch information from the touch ID assignment unit 315 operates the terminal 1 on the basis of the advanced touch information (the basic touch information, the holding hand information, and the erroneous touch information). For example, the application 32 may provide an interface easily operated by a user whether or not the holding hand is the right hand or left hand by changing positions of display buttons in the LCD display unit 20 in accordance with the hand with which the terminal 1 is held. Alternatively, the application 32 may cancel the operation of the terminal 1 based on the erroneous touch (prevention of an erroneous operation).

As described above, the touch panel controller 31 acquires the touch sensor signal waveform data as the detection data. The touch panel controller 31 generates the advanced touch information from the detection data by referring to the holding hand reference data Ref1 stored in the storage unit 40. When a size of the terminal 1 or a specification of the touch panel 10 changes or when a user of the terminal 1 changes, the touch panel controller 31 may update the holding hand reference data Ref1 in accordance with the change. The touch panel controller 31 is able to realize such update without changing a basic analysis algorism of the detection data. Thus, the touch panel controller 31 is able to flexibly correspond to the change as described above.

(Holding Hand Reference Data Ref1)

FIG. 5 is a table illustrating an example of holding hand reference data Ref1 stored in the storage unit 40. As illustrated in FIG. 5, each holding hand reference data Ref1 (data No. 1, 2 . . . ) includes reference waveform data, reference region information, and holding hand information. The reference waveform data of the holding hand reference data Ref1 is data of sensor values detected by touch sensors in a reference region when the root of the operation finger U or the non-operation finger erroneously touches the touch panel 10. The reference region information defines the reference region. The holding hand information indicates whether the hand with which the terminal 1 is held is the right hand or left hand when the holding hand reference data Ref1 is acquired.

FIGS. 6(a) and (b) illustrate an example of reference waveform data of holding hand reference data Ref1, and are graphs respectively indicating sensor values detected in reference regions (x=2, 1<=y<=11) and (x=10, 2<=y<=12). In the graph illustrated in FIG. 6(a), a relatively wide peak in a vicinity of y=5 is a sensor value detected by contact of the root of the operation finger U (here, the thumb). In the graph illustrated in FIG. 6(b), a plurality of relatively narrow peaks in a vicinity of y=4 are sensor values detected by contact of the non-operation finger.

The matching processing unit 312 calculates coincidences between the detection data and the holding hand reference data Ref1 while gradually performing phase shifting of the holding hand reference data Ref1. Then, the matching processing unit 312 determines that the highest coincidence is the coincidence between the holding hand reference data Ref1 and the detection data.

Note that, the matching processing unit 312 may multiply the coincidence of the holding hand reference data Ref1 by a greater (smaller) weight coefficient as the touch position determined by the touch position determination unit 311 is closer to (farther from) the reference region of the holding hand reference data Ref1.

(Flow of Advanced Touch Information Generation Processing)

Figure 7:
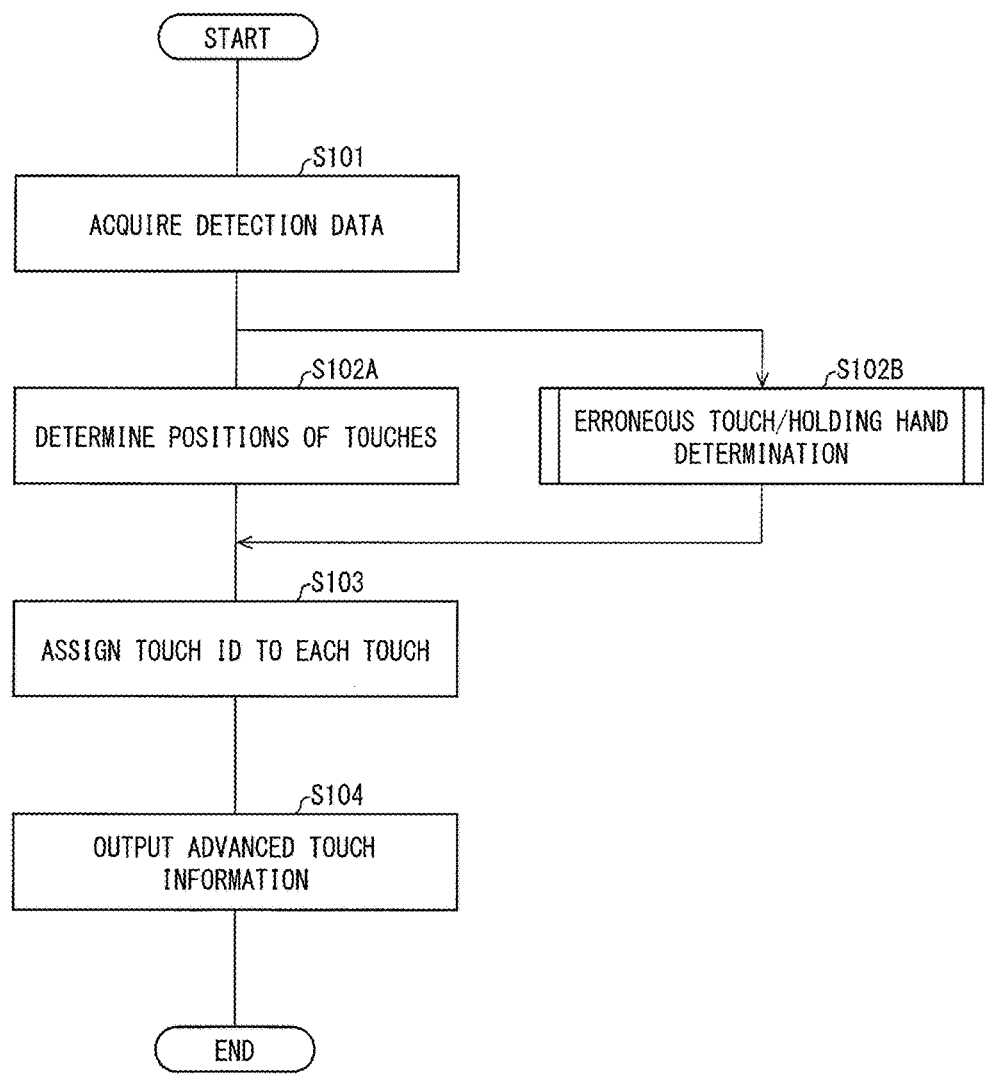
FIG. 7 is a flowchart illustrating a flow of advanced touch information generation processing executed by the touch panel controller of the mobile information terminal according to Embodiment 1.

A flow of advanced touch information generation processing executed by the touch panel controller 31 will be described with reference to FIG. 7. FIG. 7 is a flowchart illustrating the flow of the advanced touch information generation processing.

As illustrated in FIG. 7, first, the touch position determination unit 311 acquires detection data from the touch panel 10 (S101). The touch position determination unit 311 then determines positions and sizes of touches from the acquired detection data (S102A).

The matching processing unit 312, the erroneous touch position determination unit 313, and the holding hand determination unit 314 execute erroneous touch/holding hand determination processing for determining a position of an erroneous touch and a hand with which the terminal 1 is held (S102B). Note that, the flow of the erroneous touch/holding hand determination processing will be described later.

The touch ID assignment unit 315 assigns a touch ID to each of the touches determined by the touch position determination unit 311 (S103). Then, advanced touch information including basic touch information (the positions, sizes, and touch IDs of the touches), erroneous touch information (the position of the erroneous touch), and holding hand information (a left hand or right hand) is output (S104).

Thus, the advanced touch information generation processing ends.

(Flow of Erroneous Touch/Holding Hand Determination Processing A)

Figure 8:
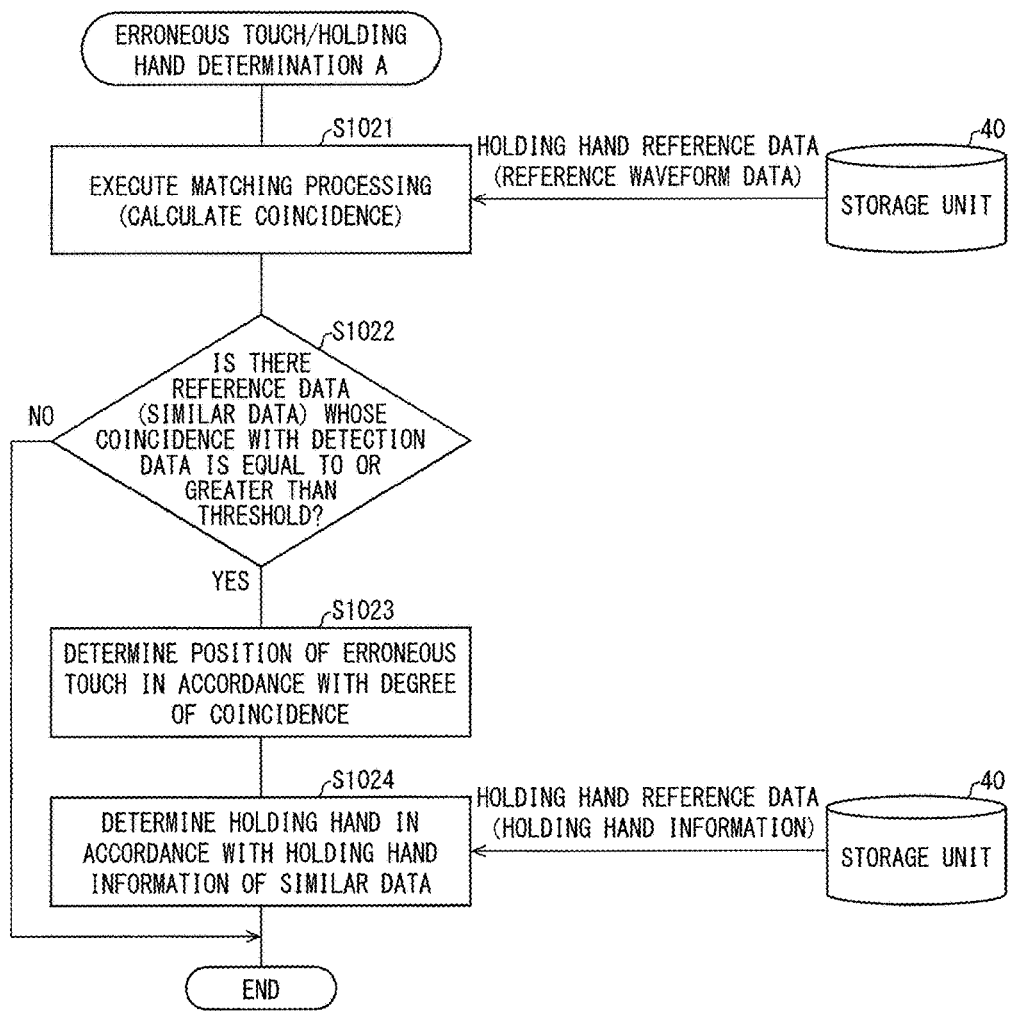
FIG. 8 is a flowchart illustrating a flow of erroneous touch/holding hand determination processing executed by the touch panel controller of the mobile information terminal according to Embodiment 1.

A flow of the erroneous touch/holding hand determination processing A executed at S102B of the aforementioned advanced touch information generation processing will be described with reference to FIG. 8. FIG. 8 is a flowchart illustrating the flow of the erroneous touch/holding hand determination processing A.

As illustrated in FIG. 8, first, the matching processing unit 312 calculates a coincidence between detection data acquired from the touch panel 10 and holding hand reference data Ref1 stored in the storage unit 40 (S1021). The matching processing unit 312 then determines whether or not there is holding hand reference data Ref1 whose coincidence with the detection data is equal to or greater than a threshold (S1022).

When there is no holding hand reference data Ref1 whose coincidence with the detection data is equal to or greater than the threshold (No at S1022), the erroneous touch/holding hand determination processing A ends. On the other hand, when there is holding hand reference data Ref1 (similar data Ref1) whose coincidence with the detection data is equal to or greater than the threshold (Yes at S1022), the erroneous touch position determination unit 313 determines that the position at which the coincidence between a sensor value of the detection data and a sensor value of the similar data Ref1 is the highest is a position of an erroneous touch (S1023).

Then, the holding hand determination unit 314 determines whether a hand with which the terminal 1 is held is the right hand or left hand in accordance with holding hand information of the similar data Ref1 acquired from the storage unit 40 (S1024).

Then, the erroneous touch/holding hand determination processing A ends.

(Modified Example 1)

In the present embodiment, a configuration in which the touch panel controller 31 separate from the CPU 30 acquires detection data from the touch panel 10 and performs generation of advanced touch information from the acquired detection data (and determination for an erroneous touch and a holding hand) has been described.

In a modified example of the present embodiment, the CPU 30 may acquire detection data from the touch panel 10 and generate advanced touch information. In other words, the touch panel controller 31 may be software installed in the CPU 30.

Figure 9:
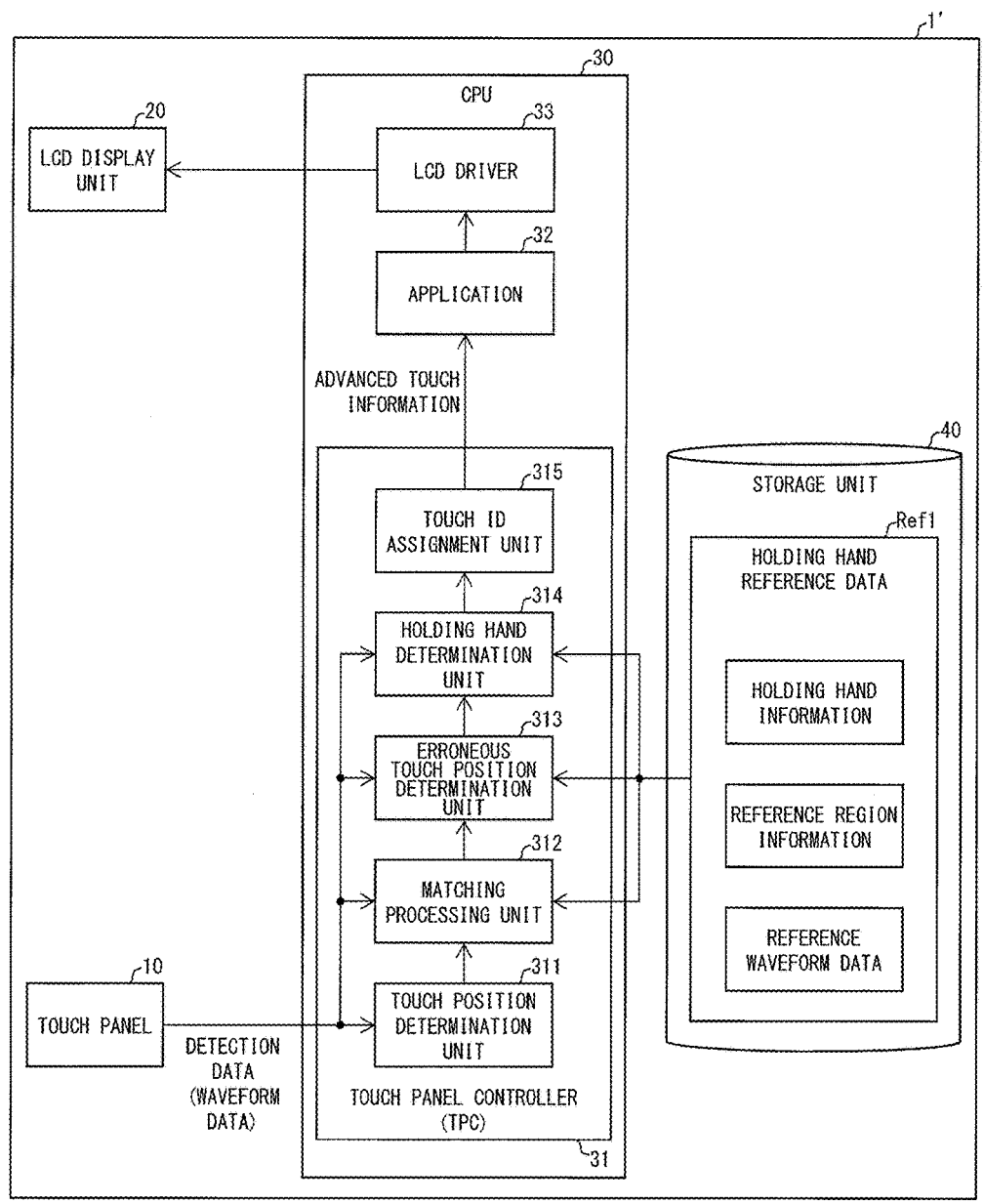
FIG. 9 is a block diagram illustrating a configuration of a mobile information terminal according to a modified example of Embodiment 1.

FIG. 9 is a block diagram illustrating a configuration of a mobile information terminal 1' (information terminal) (hereinafter, abbreviated as a terminal 1') according to the present modified example. As illustrated in FIG. 9, the touch panel controller 31 is a part of the CPU 30 in the terminal 1'.

According to the configuration of the present modified example, since the touch panel controller 31 is mounted on the CPU 30, it is possible to secure a sufficiently large capacity for storing holding hand reference data Ref1 in the storage unit 40. Further, processing speed of the advanced touch information generation processing and the erroneous touch/holding hand determination processing A is increased and a refresh rate of the CPU 30 is enhanced.

It is also possible to easily update or change a processing procedure for detection data by the touch panel controller 31 and various parameters used for the processing.

(Modified Example 2)

In another modified example of the present embodiment, the terminal 1 may include a touch sensor not only on an upper surface (touch surface) but also on a side surface. For example, a one-dimensional touch sensor may be arranged on each of upper, lower, left, and right side surfaces of the terminal 1. In such a configuration, the touch panel controller 31 executes matching processing between detection data by the one-dimensional sensor and holding hand reference data Ref1, and thereby determines a region (contact region) of the side surface of the terminal 1, with which the root of the operation finger U or the non-operation finger is in contact. Moreover, the touch panel controller 31 or the CPU 30 is able to use information of the determined contact region for determination processing of an erroneous touch and correction processing of a touch position on the upper surface of the terminal 1.

In the aforementioned configuration, however, the terminal 1 includes a one-dimensional touch sensor separately from the touch panel 10. Therefore, there is a possibility that costs and power consumption of the terminal 1, a calculation amount of the CPU 30, and the like increase. Thus, from a viewpoint of suppressing the costs, the power consumption, and the like, a configuration of including only one touch panel 10 like the terminal 1 according to the present embodiment is desired.

Note that, in the present modified example, one flexible touch panel 10 may cover from the upper surface (display surface) to the side surface of the terminal 1. Alternatively, wiring lines connected to the touch panel 10 on the upper surface may be arranged on the side surface of the terminal 1.

Embodiment 2

Another embodiment of the invention will be described as follows with reference to FIGS. 10 to 14. Note that, for convenience of description, members having the same functions as the members described in the aforementioned embodiment are denoted with the same reference signs and the description thereof will be omitted.

The terminal 1 according to Embodiment 1 above determines a position of an erroneous touch and a holding hand by referring to holding hand reference data Ref1 that is distribution data of sensor values detected by the erroneous touch.

On the other hand, a mobile information terminal 2 (information terminal) (hereinafter, abbreviated as a terminal 2) according to the present embodiment determines a position of an erroneous touch and a holding hand on the basis of operation finger reference data Ref2 that is distribution data of sensor values detected when the tip of the operation finger U touches the touch panel 10.

(Configuration of Mobile Information Terminal 2)

Figure 10:
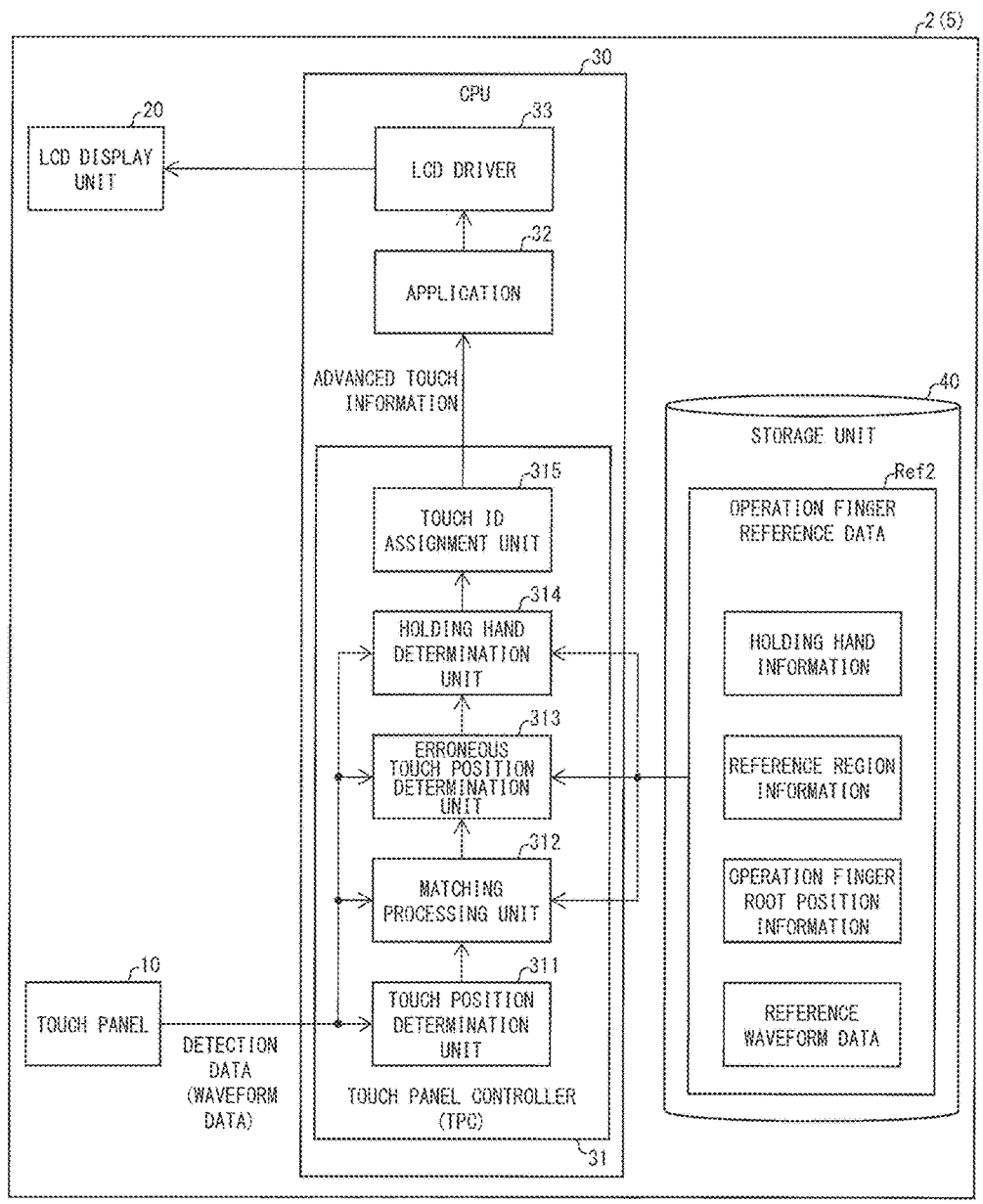
FIG. 10 is a block diagram illustrating a configuration of a mobile information terminal according to Embodiment 2.
Figure 11:
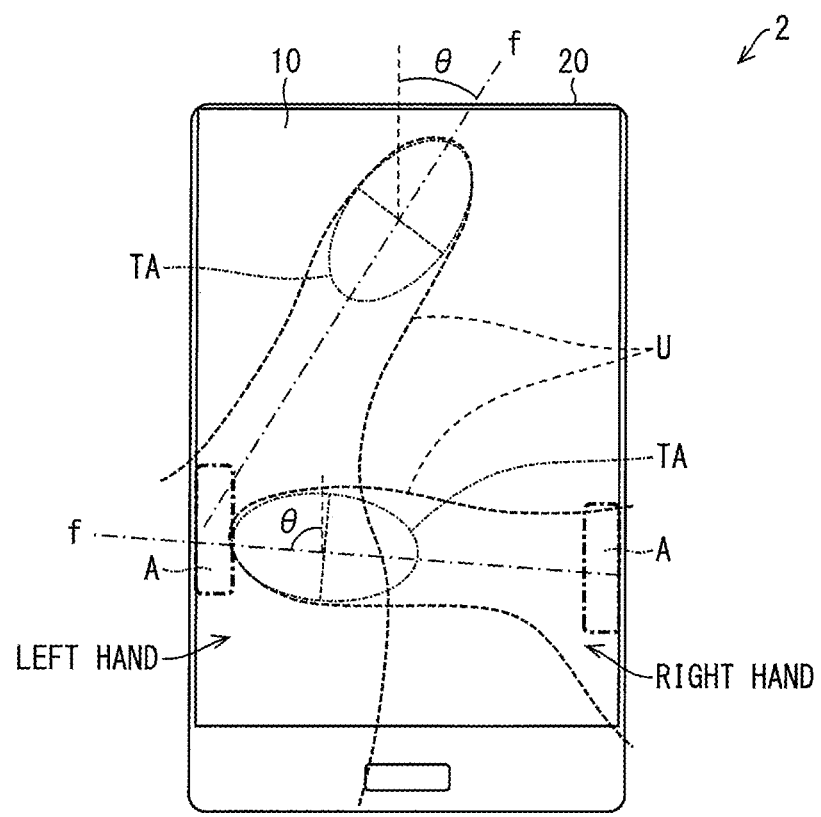
FIG. 11 is a top view illustrating an appearance of the mobile information terminal according to Embodiment 2, and illustrates a situation where a touch panel is touched.
Figure 12:
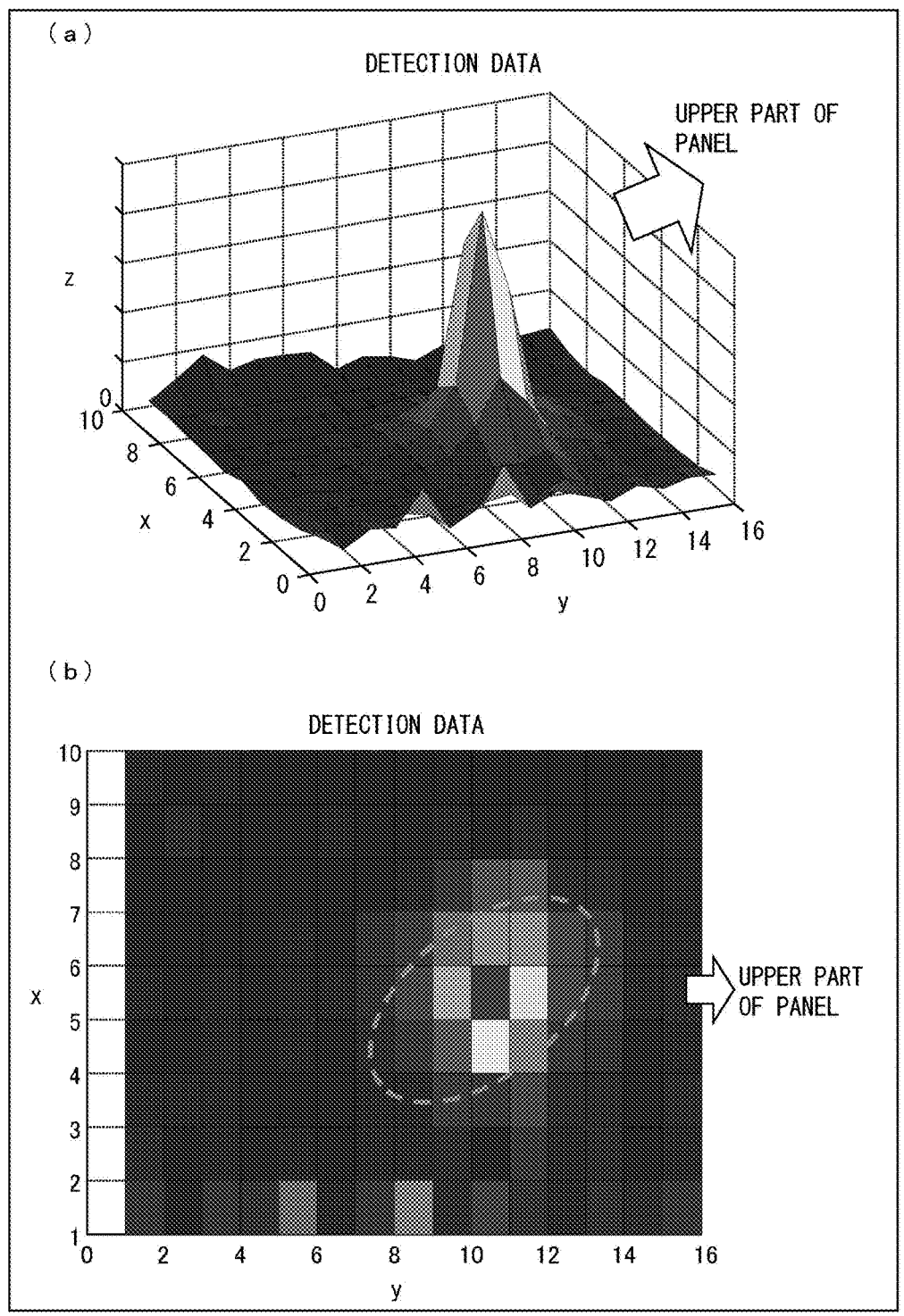
FIG. 12(*a*) illustrates an example of touch sensor signal waveform data detected by touches on a touch panel of the mobile information terminal according to Embodiment 2, and FIG. 12(*b*) is a view in which the touch sensor signal waveform data illustrated in FIG. 12(*a*) is expressed in an xy plane.

A configuration of the terminal 2 will be described with reference to FIGS. 10 and 11. FIG. 10 is a block diagram illustrating the configuration of the terminal 2. FIG. 11 is a top view illustrating an appearance of the terminal 2, and illustrates a touch on the touch panel 10 by the tip of the operation finger U.

As illustrated in FIG. 10, the operation finger reference data Ref2 is stored in the storage unit 40 of the terminal 2 instead of the holding hand reference data Ref1. The operation finger reference data Ref2 is distribution data of sensor values which are acquired in advance and detected by touches by the tip of the operation finger U. In other words, the operation finger reference data Ref2 is distribution data associated with a pre-assumed manner of holding the terminal 2. The other components of the terminal 2 are the same as those of the terminal 1' according to the modified example of Embodiment 1 above. Note that, the operation finger reference data Ref2 will be described later.

As illustrated in FIG. 11, a contact region TA of the tip of the operation finger U with the touch panel 10 has an elliptical shape. An inclination angle θ of the ellipse determines a direction in which the operation finger U is extended. The inclination angle θ and center coordinates of the contact region TA determine a straight line f passing through a position of a touch by the tip of the operation finger U and the root of the operation finger U. When a vertical direction of the terminal 2 is a direction of 0 degree, whether the inclination angle θ is positive or negative varies in accordance with whether the hand with which the terminal 2 is held is the right hand or left hand. As found from FIG. 11, when the holding hand is the right hand, normally, the root of the operation finger U is positioned on the lower right of the tip of the operation finger U and the inclination angle θ is negative (in which a clockwise direction is a positive direction). On the other hand, when the holding hand is the left hand, normally, the root of the operation finger U is positioned on the lower left of the tip of the operation finger U and the inclination angle θ is positive.

In FIG. 11, the straight line f passes through the tip (the position of the touch) of the operation finger U and the root of the operation finger U. When the holding hand is the right hand, the root of the operation finger U may contact a region A of a right end portion of the touch panel 10. On the other hand, when the holding hand is the left hand, the root of the operation finger U may contact a region A of a left end portion of the touch panel 10. The region A with which the root of the operation finger U may contact is referred to as an erroneous touch region A below. The erroneous touch region A is able to be determined by the position of the touch by the tip of the operation finger U and the inclination angle θ.

FIG. 12(a) illustrates an example of touch sensor signal waveform data detected through touches by the tip of the operation finger U, and FIG. 12(b) is a view in which the touch sensor signal waveform data illustrated in FIG. 12(a) is expressed in an xy plane. As indicated with a broken line in FIG. 12(b), an aggregation of touch sensors having detected touches by the tip of the operation finger U has an almost elliptical shape.

(Operation Finger Reference Data Ref2)

FIG. 13 is a table illustrating an example of the operation finger reference data Ref2 stored in the storage unit 40. As illustrated in FIG. 13, the operation finger reference data Ref2 includes operation finger root position information in addition to reference waveform data, reference region information, and holding hand information. The reference waveform data of the holding hand reference data Ref1 is data of sensor values detected by touch sensors in a reference region when the tip of the operation finger U (the thumb or the forefinger) touches the touch panel 10. The reference region information is information that defines the reference region. The operation finger root position information is information indicating a position of the root of the operation finger U when the holding hand reference data Ref1 is acquired.

Note that, the operation finger reference data Ref2 may include angle information indicating a direction in which the operation finger U is extended instead of the operation finger root position information.

(Flow of Erroneous Touch/Holding Hand Determination Processing B)

The touch panel controller 31 of the present embodiment executes erroneous touch/holding hand determination processing B described below instead of the erroneous touch/holding hand determination processing A at S102B of the advanced touch information generation processing. Note that, an entire flow of the advanced touch information generation processing is the same as the flow described in Embodiment 1 above.

Figure 14:
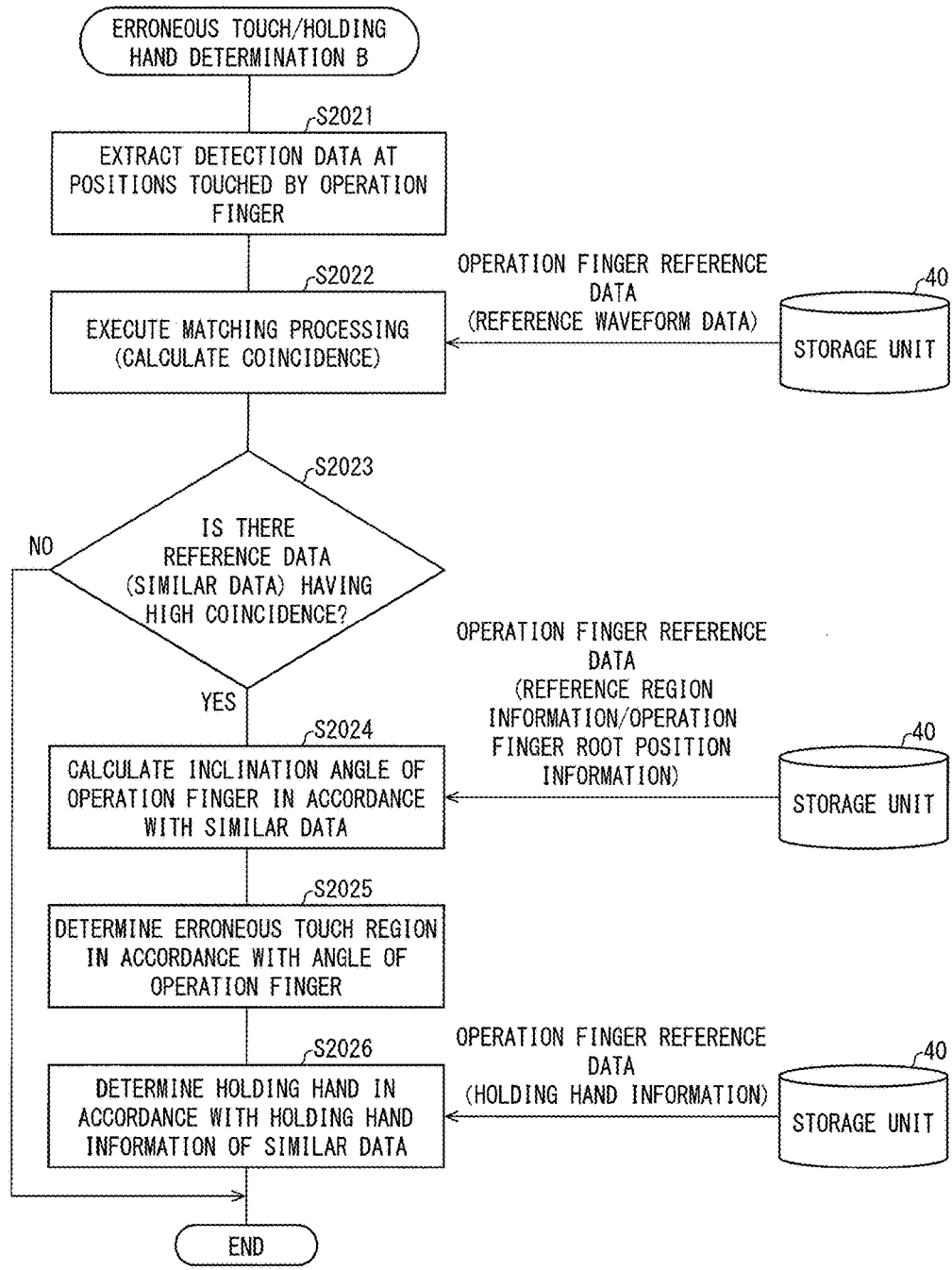
FIG. 14 is a flowchart illustrating a flow of erroneous touch/holding hand determination processing executed by a touch panel controller of the mobile information terminal according to Embodiment 2.

A flow of the erroneous touch/holding hand determination processing B will be specifically described with reference to FIG. 14. FIG. 14 is a flowchart illustrating the flow of the erroneous touch/holding hand determination processing B.

As illustrated in FIG. 14, first, the matching processing unit 312 extracts detection data obtained from touch sensors at positions touched by the tip of the operation finger U from detection data obtained from touch sensors of the touch panel 10 (S2021). For example, the matching processing unit 312 extracts detection data (hereinafter, referred to as extracted data) obtained from 5×5 touch sensors near a maximum signal peak from detection data obtained from the touch sensors of the whole of the touch panel 10.

Subsequently, the matching processing unit 312 acquires operation finger reference data Ref2 from the storage unit 40. Then, by performing matching processing between the extracted data and the operation finger reference data Ref2, the matching processing unit 312 calculates a coincidence between both of the data (S2022). After that, the matching processing unit 312 determines whether or not there is operation finger reference data Ref2 whose coincidence with the extracted data is equal to or greater than a threshold (S2023).

Here, the number of touch sensors included in a mobile information terminal is generally small (for example, about 10 (w)×20 (h)). Thus, there is difficulty for the matching processing unit 312 to determine a detailed shape (for example, inclination) of a contact region only from extracted data. However, there is a clear difference between pieces of touch sensor signal waveform data detected through touches by the operation finger U with different inclination angles θ. Conversely, plural pieces of touch sensor signal waveform data having a high coincidence with each other are more likely to be data obtained through touches by the operation finger U with almost equal inclination angles θ. Accordingly, when a coincidence between the detection data and certain operation finger reference data Ref2 is sufficiently high, the both data are considered to be data obtained through touches by the tip of the operation finger U with almost equal inclination angles θ.

As illustrated in FIG. 14, in a case where there is no operation finger reference data Ref2 whose coincidence with the extracted data is equal to or greater than the threshold (No at S2023), the erroneous touch/holding hand determination processing B ends. On the other hand, in a case where there is operation finger reference data Ref2 (hereinafter, referred to as similar data Ref2) whose coincidence with the extracted data is equal to or greater than the threshold (Yes at S2023), the erroneous touch position determination unit 313 calculates an inclination angle θ of the operation finger U in accordance with the similar data Ref2 (S2024).

Specifically, the erroneous touch position determination unit 313 calculates the inclination angle θ of a straight line f passing through center coordinates (x, y) of a reference region described as reference region information and position coordinates (x=0, y) of the root of the operation finger U described as operation finger root position information. The erroneous touch position determination unit 313 uses the center coordinates (x, y) of the reference region as position coordinates of the touch in the aforementioned calculation.

Next, the erroneous touch position determination unit 313 determines an erroneous touch region A by using the touch position determined by the touch position determination unit 311 and the inclination angle θ calculated at S2024 (S2025).

Finally, the holding hand determination unit 314 acquires the similar data Ref2 from the storage unit 40 and determines whether the hand with which the terminal 1 is held is the right hand or left hand on the basis of holding hand information of the similar data Ref2 (S2026). Thus, the erroneous touch/holding hand determination processing B ends.

The erroneous touch/holding hand determination processing B described here is able to be combined with the erroneous touch/holding hand determination processing A described in Embodiment 1 above. For example, the touch panel controller 31 determines a position of an erroneous touch and a holding hand through the erroneous touch/holding hand determination processing B and determines a position of an erroneous touch and a holding hand also through the erroneous touch/holding hand determination processing A. When determination results obtained by the both determination processing are not equal to each other, the touch panel controller 31 compares maximum coincidences obtained by the matching processing (S1021, S2022) of the both determination processing and prioritizes the determination result obtained by the determination processing through which a higher coincidence is obtained.

Note that, in the advanced touch information generation processing according to the present embodiment, when a position of a touch, which is determined by the touch position determination unit 311, is included in the erroneous touch region A, the touch ID assignment unit 315 may remove the touch. Moreover, the touch ID assignment unit 315 may correct the position of the touch, which is determined by the touch position determination unit 311, on the basis of holding hand information of the similar data Ref2. For example, when the holding hand is the right hand (left hand), the touch panel 10 generally tends to be touched at a position slightly diagonal to the lower right (left) of a position at which an icon or a key is displayed. Thus, the touch ID assignment unit 311 may displace the touch position determined by the touch position determination unit 315 to a position slightly diagonal to the upper left.

Embodiment 3

Figure 15:
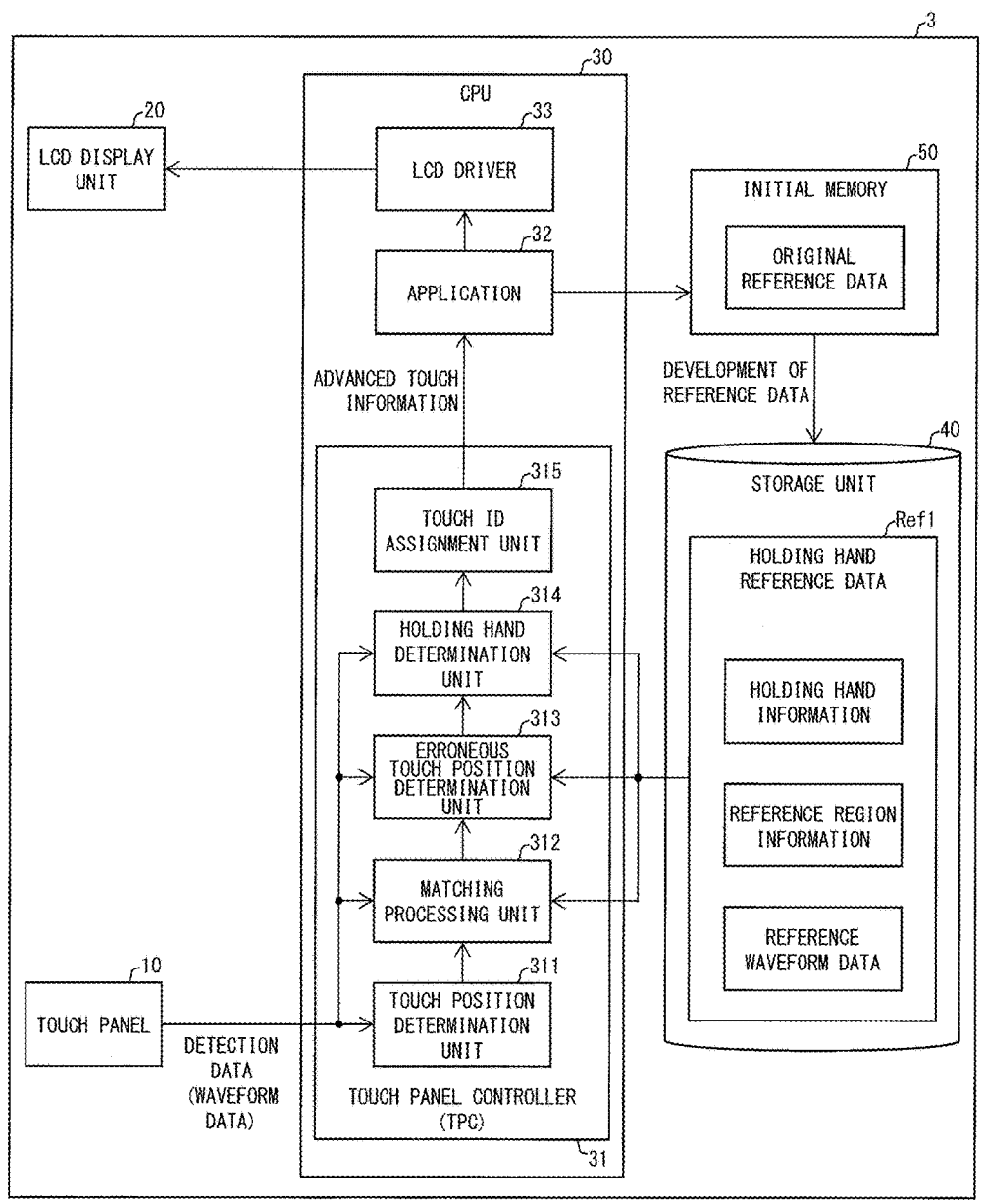
FIG. 15 is a block diagram illustrating a configuration of a mobile information terminal according to Embodiment 3.

Another embodiment of the invention will be described as follows with reference to FIGS. 15 to 17. Note that, for convenience of description, members having the same functions as the members described in the aforementioned embodiments are denoted with the same reference signs and the description thereof will be omitted.

Characteristics (such as an age, sex, a dominant hand, a hand size, a shape of a finger of a hand, and a manner of holding a terminal) are different between users using a mobile information terminal. When user characteristics are different, reference data needed for accurately determining a position of an erroneous touch and a holding hand is also different. Therefore, in order to accurately determine a position of an erroneous touch and a holding hand with respect to every user, it is necessary to prepare the great number of pieces of reference data, and it is also necessary to prepare a large-capacity storage unit for storing the pieces of reference data. In addition, as the number of pieces of the reference data to be prepared increases, the number of times and a required time of processing for matching detection data with each of the reference data also increase.

Thus, a mobile information terminal 3 (information terminal) (hereinafter, abbreviated as a terminal 3) according to the present embodiment causes the storage unit 40 to store only reference data matching a user on the basis of user information registered at the time of initial setting. Since the terminal 3 is a belonging of an individual in many cases, even when the reference data to be stored in the storage unit 40 is limited in accordance with user characteristics, accuracy for determining a position of an erroneous touch and a holding hand is not degraded so much. Accordingly, the terminal 3 is able to achieve reduction in the capacity of the storage unit 40, and the number of times and the required time of the matching processing while keeping accuracy for determining a position of an erroneous touch and a holding hand.

(Configuration of Mobile Information Terminal 3)

A configuration of the terminal 3 will be described with reference to FIG. 15. FIG. 15 is a block diagram illustrating the configuration of the terminal 3. As illustrated in FIG. 15, the terminal 3 further includes an initial memory 50 (storage device), which is able to be used by the terminal 3, in addition to the components of the terminal 1' according to the modified example of Embodiment 1 above. The other components of the terminal 3 are the same as the components of the terminal 1'. In the initial memory 50, reference data (hereinafter, called original reference data) matching characteristics of various users is stored in a compressed state.

The terminal 3 receives, for example, setting of the following user information in initial setting.

age, sex, dominant hand hand size (S, M, L, O, etc.)

manner of holding terminal 3 (registered for each application)

shape of region where each finger contacts touch panel 10

Alternatively, the terminal 3 may receive selection or input of user information from a setting screen or request the user to hold the terminal 3 or touch the touch panel 10 by each finger in order to acquire information related to user characteristics.

The application 32 of the terminal 3 extracts, from the initial memory 50, reference data matching the user information which is set and develops the reference data in the storage unit 40. The reference data developed in this manner serves as the holding hand reference data Ref1 described in Embodiment 1 above.

FIG. 16 is a table illustrating a relation between user information and holding hand reference data Ref1 stored in the storage unit 40. As illustrated in FIG. 16, when an age is set as user information, for example, the application 32 stores, as the holding hand reference data Ref1, original reference data matching a hand size of a user in the storage unit 40 in accordance with the set age.

Note that, in order to secure sufficient available capacity of the initial memory 50, the application 32 may delete data having low priority and unused data from the original reference data stored in the initial memory 50. In a case where the terminal 3 is shared by a plurality of users, the application 32 may update the holding hand reference data Ref1 when user authentication is performed or when a user is switched.

(Modified Example)

The original reference data may be stored in an external memory.

Figure 17:
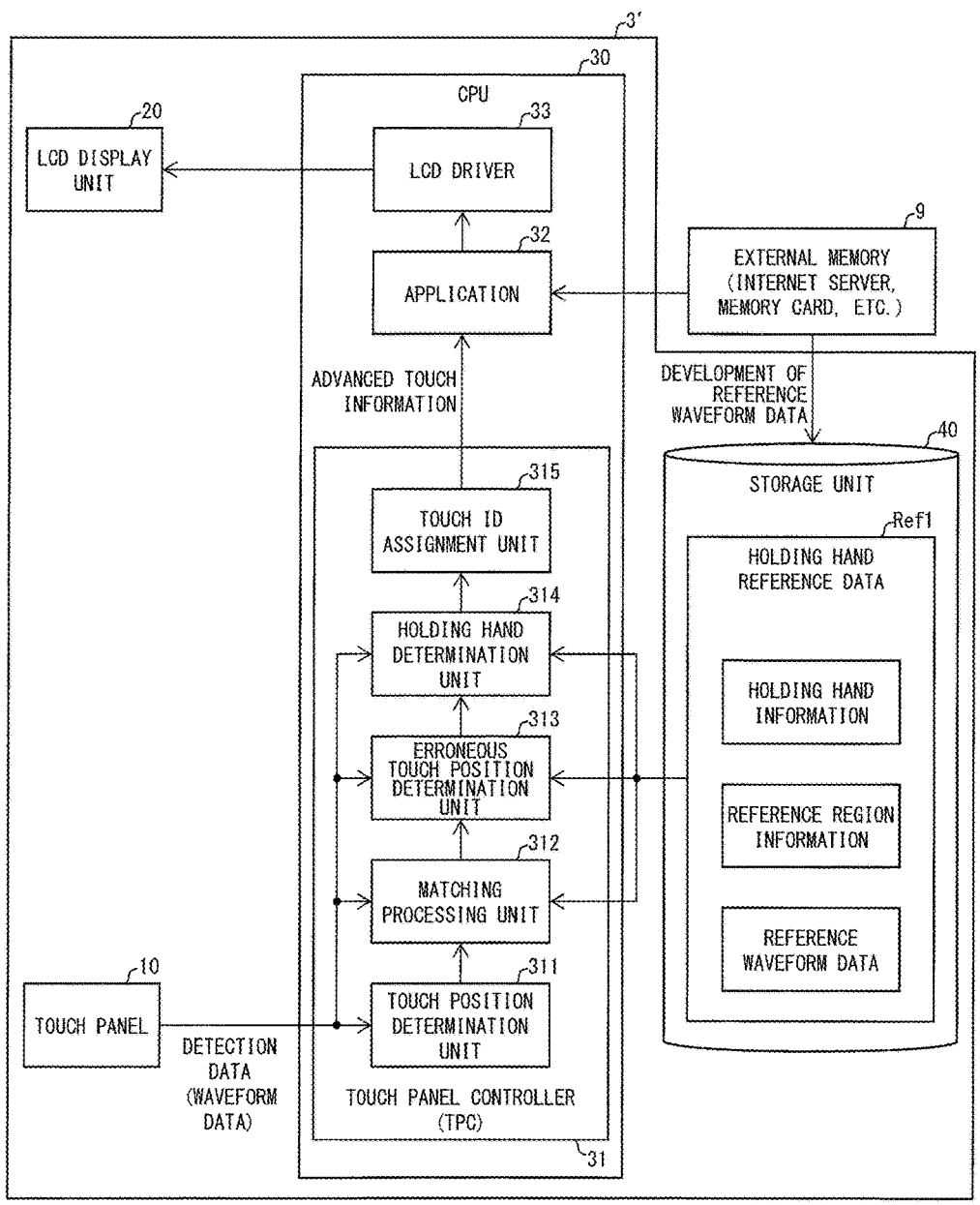
FIG. 17 is a block diagram illustrating a configuration of a mobile information terminal according to a modified example of Embodiment 3.

FIG. 17 is a block diagram illustrating a configuration of a terminal 3' according to a modified example of the present embodiment. In the present modified example, original reference data is stored in an external memory 9 (an external storage device that is able to be used by the terminal 3') such as an Internet server or a memory card. The application 32 extracts, from the external memory 9, reference data matching user information acquired in advance by the terminal 3' and develops the reference data in the storage unit 40.

Embodiment 4

Another embodiment of the invention will be described as follows with reference to FIG. 18. Note that, for convenience of description, members having the same functions as the members described in the aforementioned embodiments are denoted with the same reference signs and the description thereof will be omitted.

A mobile information terminal 4 (information terminal) (hereinafter, a terminal 4) according to the present embodiment updates (deletes) reference data, which is stored in the storage unit 40, so as to match user characteristics on the basis of detection data (a mobile information terminal of a learning type). Thus, as time of using the terminal 4 by the user is longer, efficiency and accuracy of erroneous touch/holding hand determination processing are improved.

(Configuration of Mobile Information Terminal 4)

Figure 18:
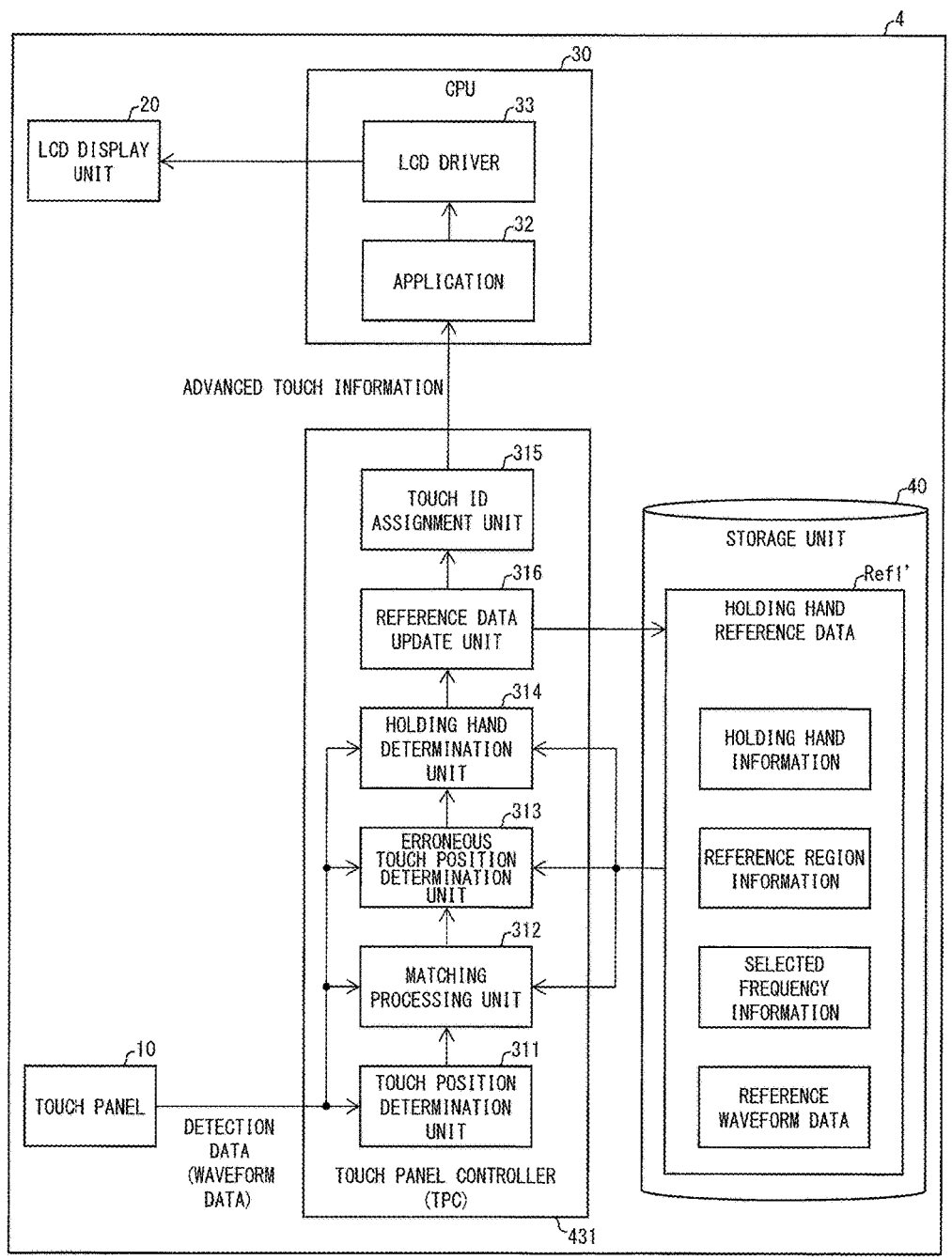
FIG. 18 is a block diagram illustrating a configuration of a mobile information terminal according to Embodiment 4.

FIG. 18 is a block diagram illustrating a configuration of the terminal 4. As illustrated in FIG. 18, selected frequency information which is a frequency that a coincidence with detection data is determined to be equal to or greater than a threshold is added to holding hand reference data Ref1' stored in the storage unit 40 of the terminal 4. A touch panel controller 431 (holding manner determination device) further includes a reference data update unit 316 (a reference data deletion unit, a reference data addition unit) in addition to the components of the touch panel controller 31 of the terminal 1 of Embodiment 1 above. The other components of the terminal 4 are the same as the components of the terminal 1.

The matching processing unit 312 of the terminal 4 determines similar data Ref1 that is holding hand reference data Ref1 whose coincidence with detection data is equal to or greater than a threshold. Then, the matching processing unit 312 counts up selected frequency information of the similar data Ref1 stored in the storage unit 40.

Each time the matching processing unit 312 performs matching processing for the predetermined number of pieces of detection data, the reference data update unit 316 refers to the selected frequency information added to the holding hand reference data Ref1 stored in the storage unit 40. The reference data update unit 316 then deletes, from the storage unit 40, the holding hand reference data Ref1 whose selected frequency is smaller than a reference value. In erroneous touch/holding hand determination processing C described later, order (priority) in which the holding hand reference data Ref1 is referred to is rearranged in descending order of the selected frequency.

Thereby, the number of pieces of the holding hand reference data Ref1 stored in the storage unit 40 is reduced, so that the number of times of executing the matching processing executed by the matching processing unit 312 is reduced. As a result, efficiency of the matching processing is improved and power consumption of the terminal 4 is reduced.

Note that, the matching processing unit 312 may give higher priority to the order of the matching processing with respect to the holding hand reference data Ref1 whose selected frequency is greater in the erroneous touch/holding hand determination processing A described in Embodiment 1 above. In a case where a coincidence between the detection data and the holding hand reference data Ref1 having high priority is higher than the threshold, matching processing between the detection data and the holding hand reference data Ref1 having low priority may be omitted. With the configuration described above, the number of times and the required time of the matching processing are able to be reduced.

Moreover, update of the holding hand reference data Ref1 by the reference data update unit 316 may be executed in each frame or may be executed only in a frame in which the number of times of executing the matching processing exceeds a threshold. In the latter configuration, the matching processing unit 312 counts the number of times of executing the matching processing and stores the number of counts in a memory (such as the storage unit 40). Then, after the reference data update unit 316 updates the holding hand reference data Ref1 stored in the storage unit 40, the matching processing unit 312 resets the aforementioned number of counts in the memory.

Embodiment 5

Figure 19:
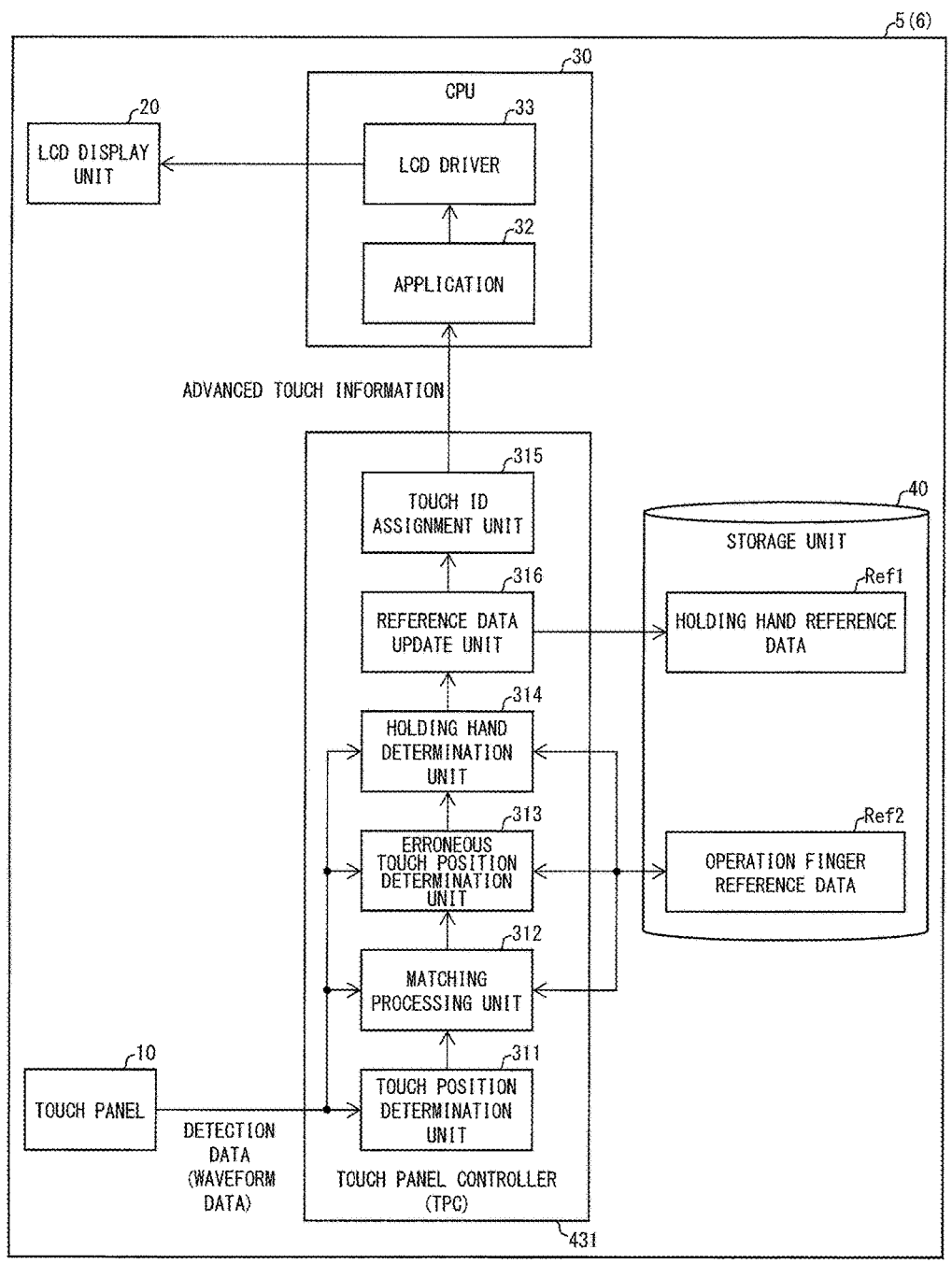
FIG. 19 is a block diagram illustrating a configuration of a mobile information terminal according to Embodiment 5.

Another embodiment of the invention will be described as follows with reference to FIGS. 19 and 20. Note that, for convenience of description, members having the same functions as the members described in the aforementioned embodiments are denoted with the same reference signs and the description thereof will be omitted.

A mobile information terminal 5 (information terminal) (hereinafter, abbreviated as a terminal 5) according to the present embodiment updates (adds, replaces) reference data, which is stored in the storage unit 40, to match user characteristics in accordance with a predetermined trigger.

(Configuration of Mobile Information Terminal 5)

A configuration of the terminal 5 will be described with reference to FIG. 19. FIG. 19 is a block diagram illustrating the configuration of the terminal 5. As illustrated in FIG. 19, the holding hand reference data Ref1 and the operation finger reference data Ref2 which are described in Embodiments 1 and 2 above are stored in the storage unit 40 of the terminal 5. The other components of the terminal 5 are the same as the components of the terminal 4 of Embodiment 4 above.

The matching processing unit 312, the erroneous touch position determination unit 313, and the holding hand determination unit 314 of the terminal 5 execute determination processing in which the erroneous touch/holding hand determination processing A and the erroneous touch/holding hand determination processing B that are described in Embodiments 1 and 2 above are combined. For example, the matching processing unit 312, the erroneous touch position determination unit 313, and the holding hand determination unit 314 determine a position of an erroneous touch and a holding hand through the erroneous touch/holding hand determination processing A and determine a position of an erroneous touch and a holding hand also through the erroneous touch/holding hand determination processing B. When determination results obtained by the both determination processing are not equal to each other, the erroneous touch position determination unit 313 and the holding hand determination unit 314 compare maximum coincidences obtained by the matching processing (S1021, S2022) of the both determination processing and prioritize the determination result obtained by the determination processing through which a higher coincidence is obtained.

After the erroneous touch/holding hand determination processing A and B ends, the reference data update unit 316 of the terminal 5 executes reference data update processing for updating (adding or replacing) the holding hand reference data Ref1 stored in the storage unit 40. More specifically, (i) when data (hereinafter, called erroneous touch data) detected by the erroneous touch is included in the detection data and (ii) when the holding hand reference data Ref1 whose coincidence with the erroneous touch data is high is not stored in the storage unit 40, the reference data update unit 316 causes the storage unit 40 to store the erroneous touch data as new holding hand reference data Ref1. In other words, the reference data update unit 316 causes the storage unit 40 to store, as new reference data corresponding to the holding hand determined by the holding hand determination unit 314, the detection data whose coincidences with respective pieces of the reference data that have been already stored in the storage unit 40 are all lower than a predetermined value.

The reference data update unit 316 may cause the storage unit 40 to store the erroneous touch data and delete any one of the holding hand reference data Ref1 stored in the storage unit 40. In other words, the reference data update unit 316 may replace the holding hand reference data Ref1 stored in the storage unit 40 with the erroneous touch data. As a result, accuracy for determining the position of the erroneous touch and the holding hand by the erroneous touch/holding hand determination processing A is improved.

Note that, the reference data update unit 316 does not need to execute the reference data update processing for each frame. Only when a coincidence between similar data and detection data is sufficiently high or when a coincidence between similar data and detection data is always high during a few frames, the reference data update unit 316 is desired to execute the reference data update processing described above.

(Flow of Reference Data Update Processing)

A flow of the reference data update processing executed by the reference data update unit 316 will be specifically described with reference to FIG. 20. FIG. 20 is a flowchart illustrating the flow of the reference data update processing. The reference data update processing is executed after the erroneous touch/holding hand determination processing B is executed.

Figure 20:
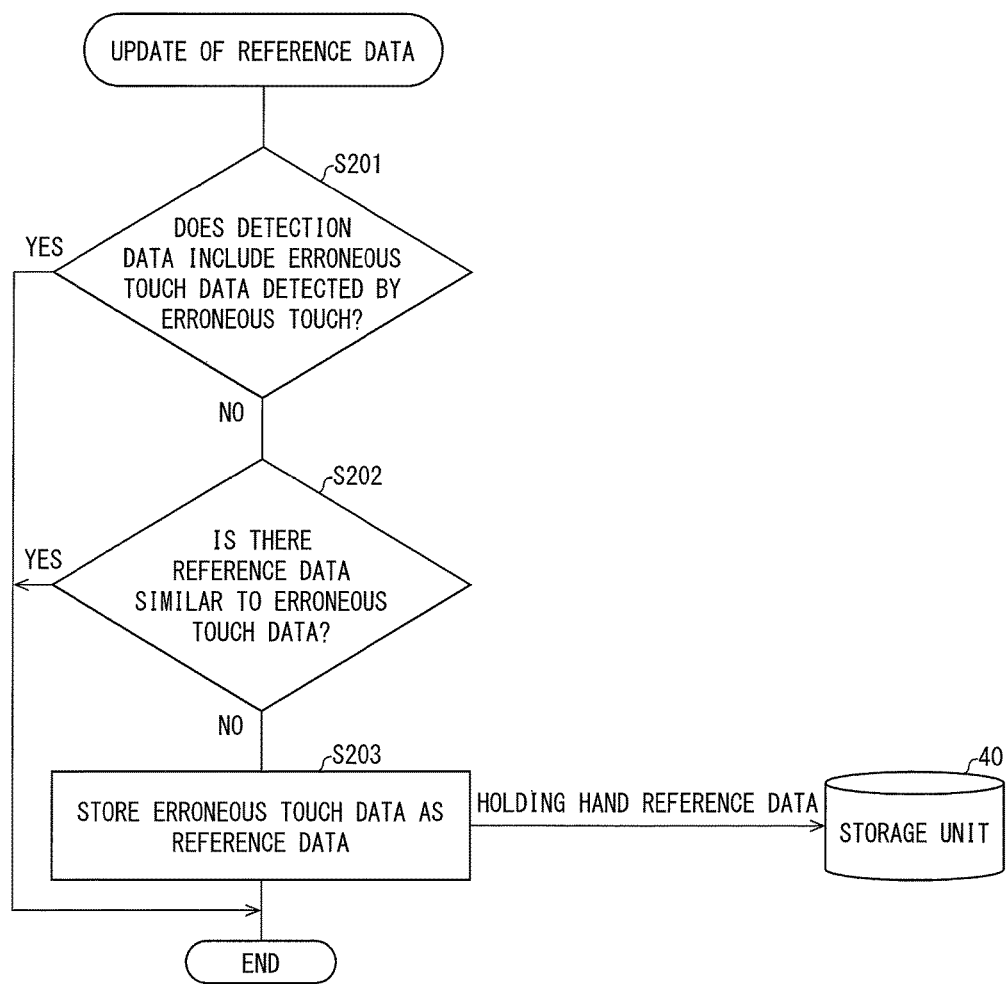
FIG. 20 is a flowchart illustrating a flow of reference data update processing according to Embodiment 5.

As illustrated in FIG. 20, in the reference data update processing, first, the reference data update unit 316 determines whether or not data (erroneous touch data) detected by an erroneous touch is included in detection data (S201). For example, the reference data update unit 316 determines that a touch included in the erroneous touch region A among touches determined by the touch position determination unit 311 is the erroneous touch. Then, the reference data update unit 316 determines that distribution data of sensor values detected near a position of the erroneous touch is the erroneous touch data.

When the erroneous touch data is included in the detection data (Yes at S201), the reference data update processing ends. On the other hand, when the erroneous touch data is not included in the detection data (No at S201), the reference data update unit 316 refers to the holding hand reference data Ref1 stored in the storage unit 40 to thereby determine whether or not there is holding hand reference data Ref1 whose coincidence with the erroneous touch data is equal to or greater than a predetermined value (S202).

When there is holding hand reference data Ref1 whose coincidence with the erroneous touch data is equal to or greater than the predetermined value (Yes at S202), the reference data update processing ends. On the other hand, when there is no holding hand reference data Ref1 whose coincidence with the erroneous touch data is equal to or greater than the predetermined value (No at S202), the reference data update unit 316 causes the storage unit 40 to store the erroneous touch data as new holding hand reference data Ref1 (S203). Thus, the reference data update processing ends.

Note that, in a case where the accuracy for determining the position of the erroneous touch and the holding hand by the erroneous touch/holding hand determination processing A is higher than the accuracy for determining the position of the erroneous touch and the holding hand by the erroneous touch/holding hand determination processing B, the reference data update unit 316 may update the operation finger reference data Ref2, which is stored in the storage unit 40, on the basis of the determination result of the position of the erroneous touch and the holding hand by the erroneous touch/holding hand determination processing A.

Embodiment 6

Another embodiment of the invention will be described. Note that, for convenience of description, members having the same functions as the members described in the aforementioned embodiments are denoted with the same reference signs and the description thereof will be omitted.

A mobile information terminal 6 (information terminal) (hereinafter, abbreviated as a terminal 6) according to the present embodiment updates reference data being triggered by a user operation. The terminal 6 has the same configuration as that of the terminal 5 of Embodiment 5 above. Similarly to the terminal 5, the terminal 6 executes determination processing in which the erroneous touch/holding hand determination processing A and the erroneous touch/holding hand determination processing B are combined.

The reference data update unit 316 of the present embodiment instructs the application 32 to display a button, which is used for a user to select a holding hand (left hand/right hand), on the LCD display unit 20. The user presses the displayed button to thereby notify, to the terminal 6, whether the holding hand is the right hand or left hand. After that, when the holding hand determined on the basis of detection data and similar data Ref2 in the erroneous touch/holding hand determination processing B is different from the holding hand notified by the user, the reference data update unit 316 deletes the similar data from the storage unit 40. When there is no operation finger reference data Ref2 whose coincidence with the detection data is high in the erroneous touch/holding hand determination processing B, the reference data update unit 316 associates the detection data with holding hand information notified by the user and adds them to the storage unit 40 as new operation finger reference data Ref2.

Further, the reference data update unit 316 instructs the application 32 to always display the determination result (left hand/right hand) of the holding hand, which is obtained by the erroneous touch/holding hand determination processing B, on the LCD display unit 20 and display a button for notifying, to the reference data update unit 316, that there is an error in the determination result. When there is an error in the determination result of the holding hand, which is obtained by the erroneous touch/holding hand determination processing B, the user presses the displayed button.

Note that, an operation for the user to notify, to the reference data update unit 316, that there is an error in the determination result may be an operation of double tapping an end portion of the LCD display unit 20. For example, when a right (left) end portion of the LCD display unit 20 is double tapped, the reference data update unit 316 may determine that the holding hand is the right hand (left hand).

Alternatively, the reference data update unit 316 may instruct the application 32 to display a button to be pressed by the user when an erroneous operation by contact that is not intended by the user occurs. With such a configuration, the reference data update unit 316 saves the detection data in a memory for a fixed time period. When the button is pressed, the reference data update unit 316 determines that the detection data that has been detected most recently is data detected by the erroneous touch and store the detection data in the storage unit 40 as the holding hand reference data Ref1.

Note that, when the user presses a "back" key (or a "backspace" key) soon after performing some sort of operation (for example, inputting of a character), the reference data update unit 316 may determine that the detection data that has been detected most recently is data detected by the erroneous touch and store the detection data in the storage unit 40 as the holding hand reference data Ref1.

[Realization Example by Software]

Each control block (particularly, each unit of the touch panel controllers 31, 431, and 531) of the mobile information terminals 1, 1a, 2, 3, 4, and 5 may be realized by a logical circuit (hardware) formed in an integrated circuit (IC chip) or the like, or may be realized by software by using a CPU (Central Processing Unit).

In the latter case, each of the mobile information terminals 1, 1a, 2, 3, 4, and 5 includes a CPU that executes a command of a program serving as software realizing each function, a ROM (Read Only Memory) or a storage device (which are referred to as a "recording medium") in which the program and various data are stored to be readable by a computer (or a CPU), a RAM (Random Access Memory) in which the program is developed, and the like. The object of the invention is achieved when the computer (or the CPU) reads the program from the recording medium for execution. As the recording medium, a "non-transitory tangible medium", for example, such as a tape, a disc, a card, a semiconductor memory, or a programmable logical circuit is able to be used. The program may be supplied to the computer via any transmission medium (such as a communication network or a broadcast wave) that is able to transmit the program. Note that, the invention may be realized also in a form of a data signal embedded in a carrier wave in which the program is provided by electronic transmission.

[Summary]

A holding manner determination device (touch panel controller 31, 431) according an aspect 1 of the invention includes a detection data acquisition unit (touch position determination unit 311) that acquires detection data which is distribution data of sensor values detected by a plurality of touch sensors of an information terminal (1, 1a, 2, 3, 4, 5); a coincidence calculation unit (matching processing unit 312) that calculates a coincidence between reference data (Ref1, Ref2), which is the distribution data associated with a pre-assumed manner of holding the information terminal, and the detection data; and a holding manner determination unit (holding hand determination unit 314) that determines a manner of holding the information terminal on the basis of the coincidence calculated by the coincidence calculation unit.

According to the aforementioned configuration, the holding manner (when the detection data is acquired) is determined on the basis of holding hand information associated with reference data whose coincidence with the detection data is high (equal to or greater than a threshold).

In this case, the detection data and the reference data are the distribution data of sensor values detected by the plurality of touch sensors and include not only information of positions and sizes of touches but also information about details of distribution of the touches. Thus, when the coincidence between the detection data and the reference data is sufficiently high, they are likely to be data detected by a touch (including an erroneous touch by the holding hand) with the same holding manner. Accordingly, with the aforementioned configuration, the holding hand (when the detection data is acquired) is able to be accurately determined on the basis of degree of the coincidence of the data.

In the holding manner determination device according to an aspect 2 of the invention, erroneous touch information indicating a position of an erroneous touch when the information terminal is held with the pre-assumed specific holding manner may be added to the reference data, and an erroneous touch determination unit (erroneous touch position determination unit 313) that determines the position of the erroneous touch on the basis of the reference data may be further included in the aspect 1.

With the aforementioned configuration, the position of the erroneous touch may be further determined in addition to the holding manner. As described above, when the coincidence between the detection data and the reference data is sufficiently high, they are likely to be data detected by a touch with the same holding manner, so that with the aforementioned configuration, the position of the erroneous touch is able to be accurately determined.

In the holding manner determination device according to an aspect 3 of the invention, the distribution data generated when a user actually holds the information terminal with the specific holding manner may be stored in a storage unit (40) of the information terminal as the reference data in the aspect 1 or 2.

With the aforementioned configuration, by referring to the reference data stored in the storage unit, the coincidence with the detection data is able to be calculated.

The holding manner determination device according to an aspect 4 of the invention may further include a reference data deletion unit (reference data update unit 316) that, in a case where as a result of calculating coincidences between the reference data and the predetermined number of pieces of detection data by the coincidence calculation unit, the number of times that a coincidence equal to or greater than a threshold is obtained does not exceed a reference value, deletes the reference data from the storage unit in the aspect 3.

With the aforementioned configuration, the reference data in which the number of times that the coincidence with the detection data exceeds a threshold is small, that is, the reference data not matching user characteristics (such as an age, sex, a dominant hand, a hand size, a shape of a finger of a hand, and a manner of holding a terminal) is deleted from the storage unit. Thus, only reference data suitable for the user characteristics easily remains in the storage unit. Thus, the holding hand and the erroneous touch are able to be accurately determined by using the reference data suitable for the user characteristics.

The holding manner determination device according to an aspect 5 of the invention may further include a reference data addition unit (reference data update unit 316) that, in a case where coincidences between the detection data and respective pieces of the reference data that have been already stored in the storage unit are all lower than a predetermined value, causes the storage unit to store the detection data as new reference data corresponding to the holding manner determined by the holding manner determination unit in the aspect 3.

With the aforementioned configuration, the detection data whose coincidence with the reference data stored in the storage unit is low is added to the storage unit as the new reference data. After that, the new reference data is able to be used for determining a holding hand and an erroneous touch.

The holding manner determination device according to an aspect 6 of the invention may further include a holding manner information output unit that outputs, to a control device that executes an application in the information terminal, a determination result which is determined by the holding manner determination unit and which indicates the manner of holding the information terminal in the aspect 1.

With the aforementioned configuration, the application having acquired holding hand information is able to perform an operation suitable for the manner of holding the information terminal. For example, the application may generate a display screen suitable for the holding hand (right hand or left hand).

The holding manner determination device according to an aspect 7 of the invention may further include an erroneous touch information output unit that outputs, to a control device that executes an application in the information terminal, a determination result which is determined by the erroneous touch determination unit and which indicates the position of the erroneous touch in the aspect 2.

With the aforementioned configuration, the application having acquired erroneous touch information is able to invalidate the erroneous touch, that is, to cancel execution of processing based on the erroneous touch without receiving the erroneous touch as a touch operation.

The holding manner determination device according to an aspect 8 of the invention may further include a reference data selection unit that selects, from pieces of reference data stored in a storage device that is able to be used by the holding manner determination device, the reference data that is used when the coincidence calculation unit calculates the coincidence between the reference data and the detection data, on the basis of user information acquired in advance by the information terminal in any one of the aspects 1 to 3.

With the aforementioned configuration, from the pieces of reference data stored in the storage device, the reference data used for calculation of the coincidence is selected on the basis of the user information acquired in advance (for example, in initial setting) by the information terminal. Specifically, the reference data suitable for user characteristics (for example, such as an age, sex, and a dominant hand), that is, the reference data that is detected by a touch sensor when a person having similar characteristics to those of the user holds the information terminal is selected. Then, the coincidence between the reference data suitable for the user characteristics and the detection data is calculated. As a result, compared to a configuration in which coincidences between all the pieces of reference data stored in the storage device and the detection data are calculated, a time required to calculate the coincidence is able to be shortened.

In the holding manner determination device according to an aspect 9 of the invention, the storage device that is able to be used may be an external storage device of the information terminal in the aspect 8.

With the aforementioned configuration, from the pieces of reference data stored in the external storage device, the reference data used for calculation of the coincidence is selected on the basis of the user information acquired in advance by the information terminal. As a result, compared to a configuration in which coincidences between all the pieces of reference data stored in the storage device and the detection data are calculated, a time required to calculate the coincidence is able to be shortened (similarly to the holding manner determination device according to the aspect 8).

The holding manner determination device according each of the aspects of the invention may be realized by a computer, and in such a case, a control program of the holding manner determination device, which causes the computer to operate as each of the units of the holding manner determination device to thereby realize the holding manner determination device by the computer, and a computer-readable recording medium having the control program recorded therein are also included in the scope of the invention.

The invention is not limited to each of the embodiments described above, and can be modified in various manners within the scope defined by the Claims, and embodiments obtained by appropriately combining technical means disclosed in different embodiments are also encompassed by the technical scope of the invention. A new technical feature can be formed by combining technical means disclosed in each of the embodiments.

Industrial Applicability

The invention is able to be used for a holding manner determination device that determines a hand with which a mobile information terminal is held.

REFERENCE SIGNS LIST 1, 1a, 2, 3, 4, 5 mobile information terminal (information terminal)
9 external memory (external storage device)
30 CPU (control device)
31, 431 touch panel controller (holding manner determination device)
311 touch position determination unit (detection data acquisition unit)
312 matching processing unit (coincidence calculation unit)
313 erroneous touch position determination unit (erroneous touch determination unit)
314 holding hand determination unit (holding manner determination unit)
315 touch ID assignment unit (holding manner information output unit, erroneous touch information output unit)
316 reference data update unit (reference data deletion unit, reference data addition unit)
32 application (reference data selection unit, reference data acquisition unit)
40 storage unit
50 initial memory (storage device)
Ref1 holding hand reference data
Ref2 operation finger reference data

The invention claimed is:

1. A holding manner determination device, comprising:
a detection data acquisition circuitry that acquires detection data which is distribution data of sensor values detected by a plurality of touch sensors of an information terminal;
a coincidence calculation circuitry that calculates a coincidence between reference data, which is the distribution data associated with a pre-assumed manner of holding the information terminal, and the detection data;
a holding manner determination circuitry that determines a manner of holding the information terminal on the basis of the coincidence calculated by the coincidence calculation circuitry; and
an erroneous touch determination circuitry that determines a position of an erroneous touch on the basis of the reference data, wherein
erroneous touch information is added to the reference data, the erroneous touch information indicating the position of the erroneous touch which is made, when a touch operation is made while the information terminal is held with the pre-assumed manner of holding the information terminal, by a part of a user other than an operation finger used to make the touch operation that causes the information terminal to execute an operation intended by the user.

2. The holding manner determination device according to claim 1, wherein the distribution data generated when a user actually holds the information terminal with the specific holding manner is stored in a storage of the information terminal as the reference data.

3. The holding manner determination device according to claim 2, further comprising a reference data deletion circuitry that, in a case where as a result of calculating coincidences between the reference data and the predetermined number of pieces of detection data by the coincidence calculation circuitry, the number of times that a coincidence equal to or greater than a threshold is obtained does not exceed a reference value, deletes the reference data from the storage.

4. The holding manner determination device according to claim 2, further comprising a reference data addition circuitry that, in a case where coincidences between the detection data and respective pieces of the reference data that have been already stored in the storage are all lower than a predetermined value, causes the storage to store the detection data as new reference data corresponding to the holding manner determined by the holding manner determination circuitry.

5. The holding manner determination device according to claim 1, further comprising a holding manner information output circuitry that outputs, to a control device that executes an application in the information terminal, a determination result which is determined by the holding manner determination circuitry and which indicates the manner of holding the information terminal.

6. The holding manner determination device according to claim 1, further comprising an erroneous touch information output circuitry that outputs, to a control device that executes an application in the information terminal, a determination result which is determined by the erroneous touch determination circuitry and which indicates the position of the erroneous touch.

7. The holding manner determination device according to claim 1, further comprising a reference data selection circuitry that selects, from pieces of reference data stored in a storage device that is able to be used by the holding manner determination device, the reference data that is used when the coincidence calculation circuitry calculates the coincidence between the reference data and the detection data, on the basis of user information acquired in advance by the information terminal.

8. The holding manner determination device according to claim 7, wherein the storage device that is able to be used is an external storage device of the information terminal.

9. A non-transitory computer-readable recording medium having a control program that causes a computer to function as the holding manner determination device according to claim 1 and that causes the computer to function as each of the circuitries.

* * * * *